United States Patent
Li et al.

(10) Patent No.: US 11,240,319 B2
(45) Date of Patent: Feb. 1, 2022

(54) NETWORK SERVICE CONTINUITY WITHOUT SESSION CONTINUITY

(71) Applicant: CONVIDA WIRELESS, LLC, Wilmington, DE (US)

(72) Inventors: Hongkun Li, Malvern, PA (US); Michael F. Starsinic, Newtown, PA (US); Rocco Di Girolamo, Laval (CA); Catalina Mihaela Mladin, Hatboro, PA (US)

(73) Assignee: Convida Wireless, LLC, Wilmington, DE (US)

( * ) Notice: Subject to any disclaimer, the term of this patent is extended or adjusted under 35 U.S.C. 154(b) by 251 days.

(21) Appl. No.: 16/488,042

(22) PCT Filed: Feb. 28, 2018

(86) PCT No.: PCT/US2018/020224
§ 371 (c)(1),
(2) Date: Aug. 22, 2019

(87) PCT Pub. No.: WO2018/160693
PCT Pub. Date: Sep. 7, 2018

(65) Prior Publication Data
US 2020/0014762 A1    Jan. 9, 2020

Related U.S. Application Data

(60) Provisional application No. 62/466,027, filed on Mar. 2, 2017.

(51) Int. Cl.
*H04W 76/19* (2018.01)
*H04L 29/08* (2006.01)
(Continued)

(52) U.S. Cl.
CPC ............ *H04L 67/146* (2013.01); *H04L 67/12* (2013.01); *H04L 67/145* (2013.01); *H04W 8/02* (2013.01); *H04W 60/04* (2013.01); *H04W 76/19* (2018.02)

(58) Field of Classification Search
CPC ..... H04L 67/146; H04L 67/12; H04L 67/145; H04L 67/143; H04L 65/1066;
(Continued)

(56) References Cited

U.S. PATENT DOCUMENTS 9,893,899 B2 *    2/2018    Yin .................... H04L 12/66
2013/0297810 A1   11/2013   Ho et al.
(Continued)

FOREIGN PATENT DOCUMENTS

CN    103338525 A    10/2013
CN    104704866 A    6/2015
(Continued)

OTHER PUBLICATIONS

3GPP SA WG2 Meeting #115 S2-163118, "Clarifications for Session and Service Continuity Framework", Cisco, May 2016, 7 pages.
(Continued)

*Primary Examiner* — Edan Orgad
*Assistant Examiner* — Malick A Sohrab
(74) *Attorney, Agent, or Firm* — BakerHostetler

(57) ABSTRACT

A Service Continuity Network Function (SCNF) may be used to provide service continuity support in IoT networks such as 3 GPP and oneM2M, whereby higher layer session and service information is associated with transport layer session information. By means of the SCNF, a higher layer service may be resumed when a new session or connection is created, without support for transport layer session continuity. The service continuity capabilities of the SCNF may be exposed to the service layer of the network by way of a resource data structure.

9 Claims, 16 Drawing Sheets

(51) Int. Cl.
*H04W 8/02* (2009.01)
*H04W 60/04* (2009.01)

(58) Field of Classification Search
CPC ...... H04L 67/141; H04L 67/147; H04W 8/02; H04W 60/04; H04W 76/19; H04W 4/70
See application file for complete search history.

(56) References Cited

U.S. PATENT DOCUMENTS

| | | |
|---|---|---|
| 2015/0033311 A1 | 1/2015 | Seed et al. |
| 2015/0033312 A1 | 1/2015 | Seed et al. |
| 2016/0037411 A1* | 2/2016 | Franklin ............... H04W 36/12 370/331 |
| 2017/0339609 A1* | 11/2017 | Youn ..................... H04W 76/11 |
| 2019/0150219 A1* | 5/2019 | Wang ............... H04W 36/0022 370/329 |
| 2019/0208465 A1* | 7/2019 | Mihaly ................. H04W 8/26 |
| 2020/0053803 A1* | 2/2020 | Youn ..................... H04L 67/148 |

FOREIGN PATENT DOCUMENTS

| | | |
|---|---|---|
| CN | 105359561 A | 2/2016 |
| WO | 2018035431 A1 | 2/2018 |

OTHER PUBLICATIONS

3GPP TS 23.401 V13.10.0, "Technical Specification Group Services and System Aspects; General Packet Radio Service (GPRS) Enhancements for Evolved Universal Terrestrial Radio Access Network (E-UTRAN) Access (Release 13)", Mar. 2017, 375 pages.
3GPP TS 23.682 V13.5.0, "Technical Specification Group Services and System Aspects; Architecture Enhancements to Facilitate Communications with Packet Data Networks and Applications (Release13)", Mar. 2016, 90 pages.
3GPP TR 23.718 V13.0.0, "Technical Specification Group Services and System Aspects; Architecture Enhancement for Flexible Mobile Service Steering (Release 13)", Sep. 2015, 38 pages.
3GPP TR 23.799 V14.0.0, "Technical Specification Group Services and System Aspects; Study on Architecture for Next Generation System (Release 14)", Dec. 2016, 522 pages.
3GPP TR 23.720 V1.3.0, "Technical Specification Group Services and System Aspects; Architecture Enhancements for Cellular Internet of Things (Release 13)", Feb. 2016, 96 pages.
ETSI GS NFV 002 V1.1.1, "Network Functions Virtualisation (NFV); Architectural Framework", Oct. 2013.
NGMN Alliance, "Description of Network Slicing Concept" Jan. 13, 2016, 7 pages.
OneM2M-TS-0001 V2.10.1, "Functional Architecture", Aug. 30, 2016, 427 pages.
I. Ali et al., "Network-based mobility management in the evolved 3GPP core network," in IEEE Communications Magazine, vol. 47, No. 2, pp. 58-66, Feb. 2009.

* cited by examiner

NETWORK SERVICE CONTINUITY WITHOUT SESSION CONTINUITY

CROSS-REFERENCE TO RELATED APPLICATIONS

This application is the National Stage Application of International Patent Application No. PCT/US2018/020224 filed Feb. 28, 2018 which claims the benefit of U.S. Provisional Application Ser. No. 62/466,027 filed Mar. 2, 2017, the disclosures of which is are hereby incorporated by reference as if set forth in their entireties herein.

BACKGROUND

Machine-To-Machine (M2M), Web-of-Things (WoT), and Internet-Of-Things (IoT) network deployments may include 3GPP 5G networks with 5G mobile core network nodes with operations such as network function virtualization and 5G connections establishment. Such operations may include session continuity and service continuity, e.g., as described in GPP TS 23.401, General Packet Radio Service (GPRS) Enhancements for Evolved Universal Terrestrial Radio Access Network (E-UTRAN) access, Release 13.

SUMMARY

A Service Continuity Network Function (SCNF) may be used to provide service continuity support in IoT networks such as 3GPP and oneM2M, whereby higher layer session and service information is associated with transport layer session information. By means of the SCNF, a higher layer service may be resumed when a new PDU session is created, without support for transport layer session continuity, either in the context of a connection-oriented Protocol Data Unit (PDU) session or a connection-less session, for example. Service continuity may be similarly provided for connection-less operations. The service continuity capabilities of the SCNF may be exposed to the service layer of the network by way of a resource data structure.

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter. Furthermore, the claimed subject matter is not limited to limitations that solve any or all disadvantages noted in any part of this disclosure.

DETAILED DESCRIPTION

Figure 1:
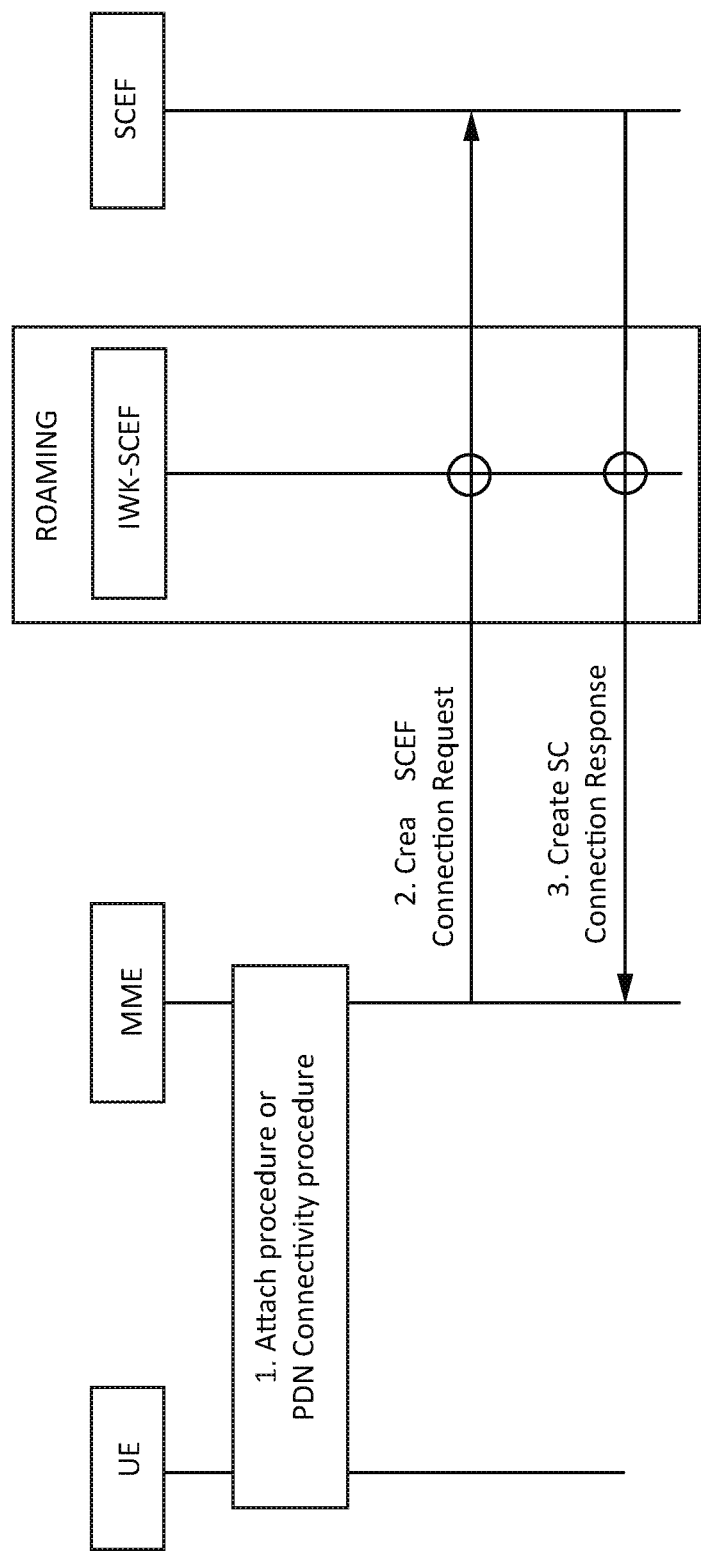
FIG. 1 is a call flow of an example method for T6a connection establishment.

A Service Continuity Network Function (SCNF) or similar means may be used to provide service continuity support in IoT networks such as 3GPP and oneM2M, whereby higher layer session and service information is associated with transport layer session information. By means of the SCNF, a higher layer service may be resumed when a new PDU session is created, without support for transport layer session continuity, either in the context of a connection-oriented Protocol Data Unit (PDU) session or a connection-less session, for example. The service continuity capabilities of the SCNF may be exposed to the service layer of the network by way of a resource data structure.

In general, service continuity may be provisioned by the network operator as a value added service when a lightweight application protocol is used at the higher layer, for example, or the UE is a constrained device, so that some session management and service management procedures at higher layer are not repeated. To accomplish this, first higher layer session and service information may be associated, e.g., in SCNF. Then higher layer service may be resumed when a new PDU session is created, without reliance on transport layer session continuity.

In IoT applications, the constrained devices may go to sleep to save power, and each may not wake up until it has some data to transfer. During the sleeping period, the devices may not be aware of their own physical movement or network status changes. In a 3GPP network, the application in a device (e.g., a UE) may not know that the old PDU session is broken in the underlying 3GPP network, and a new PDU session needs to be established with a new IP anchor. Thus, the application in the UE needs to re-register with the AS/SCS, and/or repeat some procedure for resuming the service (e.g., subscription/notification), which may introduce too much overhead especially for the constrained devices. In addition, when the session continuity is not supported in the 3GPP network, it is more difficult to restore relation between the higher layer session/service and PDU session.

TABLE 1

Abbreviations

| | |
|---|---|
| AAA | Authentication, Authorization, and Accounting |
| APN | Access Point Name |
| API | Application Program Interface |
| AS | Application Server |
| BNG | Broadband Network Gateway |
| CDN | Content Delivery Network |
| CIoT | Cellular Internet of Thing |
| CN | Core Network |
| CoAP | Constrained Application Protocol |
| CP | Control Plane |
| DL | Downlink |
| DNN | Domain Network Name |
| EPC | Evolved Packet Core |
| EPS | Evolved Packet System |
| GGSN | Gateway GPRS Support Node |
| GUTI | Globally Unique Temporary UE Identity |
| HLR | Home Location Register |
| HSS | Home Subscriber Server |
| IE | Information Element |
| IMSI | International Mobile Subscriber Identity |
| IoT | Internet of Things |
| L-GW | Local Gateway |
| LTE | Long Term Evolution |
| M2M | Machine-to-Machine |
| MM | Mobility Management |
| MME | Mobility Management Entity |
| NAS | Non Access Stratum |

TABLE 1-continued

Abbreviations

| | |
|---|---|
| NF | Network Function |
| NFV | Network Function Virtualization |
| NIDD | Non-IP Data Delivery |
| NW | Network |
| OTT | Over The Top |
| PCRF | Policy and Charging Rules Function |
| PDN | Packet Data Network |
| PDU | Packet Data Unit |
| P-GW | PDN Gateway |
| QoS | Quality of Service |
| RAN | Radio Access Network |
| RAT | Radio Access Technology |
| RNC | Radio Network Controller |
| SC | Service Continuity |
| SCS | Service Capability Server |
| SCEF | Service Capability Exposure Function |
| SGSN | Serving GPRS Support Node |
| S-GW | Serving Gateway |
| SM | Session Management |
| SSC | Session and Service Continuity |
| TAU | Tracking Area Update |
| TUPF | Terminating User Plane Function |
| UE | User Equipment |
| UL | Uplink |
| UP | User Plane |

TABLE 2

Terminology

| | |
|---|---|
| Network Function (NF) | An NF is a processing function in a network, which has defined functional behaviour and defined interfaces. An NF may be implemented either as a network element on a dedicated hardware, or as a software instance running on a dedicated hardware, or as a virtualized function instantiated on an appropriate platform, e.g. on a cloud infrastructure. |
| Network Slice Template | This refers to a set of NW functions that support certain application profile(s). |
| Network Slice Instance | An instantiation of a NW Slice Template. |
| Connection Oriented Session | A logic connection between two end points. The control signaling is exchanged for establishing such a logic connection before transferring any data between the two end points. The session information is maintained until the session is released. |
| Connection-less Session | On the contrary to the connection oriented session, data is sent from source to destination when it is available, without establishing an end-to-end connection. |
| Domain Network Name (DNN) | Used for identifying the Packet Data Network (PDN) that a UE wants to communicate with for a certain service type, e.g., DNN#1 for Internet service that requires Mobile Broadband service. |
| PDU session | An association between the UE and a data network that provides a PDU Connectivity Service. Two types of PDU sessions are defined: IP Type - data network is IP type Non-IP type - data network is non-IP |
| UE Capability Profile | What the UE is capable of doing. This profile is typically static. For example, if the UE has relay capabilities, the UE's category (e.g. maximum data rate), screen size, voice capable, IMS capable, GPS capable, etc. |
| UE Service Profile | What the UE is trying to do, may try to do, or wants to try to do. A UE's Service Profile defines what services the UE wishes to access. The network may provide these services via one or more network slice instances. A UE's Service Profile may include its location. |
| Session Management in 3GPP CN | In 3GPP CN, session management is to manage the end-to-end PDN connection (IP or non-IP type) between UE and packet data network for the data transfer through the core network with policy (e.g., QoS) and charging control enforced. |
| Service Continuity | The uninterrupted user experience of a service, including the cases where the IP address and/or anchoring point changes. |
| Session Continuity | The continuity of a PDU session. For PDU session of IP type, "session continuity" implies that the IP address is preserved for the lifetime of the PDU session. |

TABLE 2-continued

Terminology

| | |
|---|---|
| Transport Layer Session | A session that exists in the transport layer for providing data connectivity. For example, a data pipe between the UE and P-GW. Note, the PDU session define in 3GPP is a type of transport layer session. |
| Application or Service Layer Session | A session that exist in the application layer for providing a service. For example, a session between a UE Hosted Application and an Application Server. |
| Higher Layer Session | A session at a layer above what is traditionally recognized by the 3GPP data plane network nodes. For example, a service layer (e.g. oneM2M) session or an application layer session. |

The session management (SM) mechanisms are to establish the IP based PDN connection for 3GPP EPC. See 3GPP TS 23.401, General Packet Radio Service (GPRS) Enhancements for Evolved Universal Terrestrial Radio Access Network (E-UTRAN) access, Release 13. In traditional 3GPP CN, the session is created when a UE is attached to the network to connect the UE with a PDN. Specifically, in 3GPP EPC, a PDU session may consist of multiple bearers, each of which may carry different types of data flows with different QoS. A default bearer is established when a session is created.

3GPP TR 23.720, Architecture enhancements for Cellular Internet of Things, Release 13, discusses issues regarding non-IP data transfer for CIoT, including efficient support of infrequent small data transmission for Cellular IoT and support of Non IP data.

3GPP TS 23.682, Architecture enhancements to facilitate communications with packet data networks and applications, v13.5.0, describes the use of the control plane to transfer the infrequent small non-IP data for those IoT applications. Specifically, the non-IP data may be delivered via MME-SCEF control plane between UE and SCS/AS. Non-IP data delivery (NIDD) via the SCEF is handled using a PDN connection to the SCEF. The UE may obtain a Non-IP PDN connection to the SCEF either during the Attach procedure or via UE requested PDN connectivity. See 3GPP TS 23.401.

When the UE performs the EPS attach procedure with PDN type of "Non-IP", and the subscription information corresponding to either the default APN for PDN type of "Non-IP" or the UE requested APN includes the "Invoke SCEF Selection" indicator, then the MME initiates a T6a connection towards the SCEF corresponding to the "SCEF ID" indicator for that APN. FIG. 1 shows the T6a connection establishment procedure, including the roaming scenario.

Figure 2:
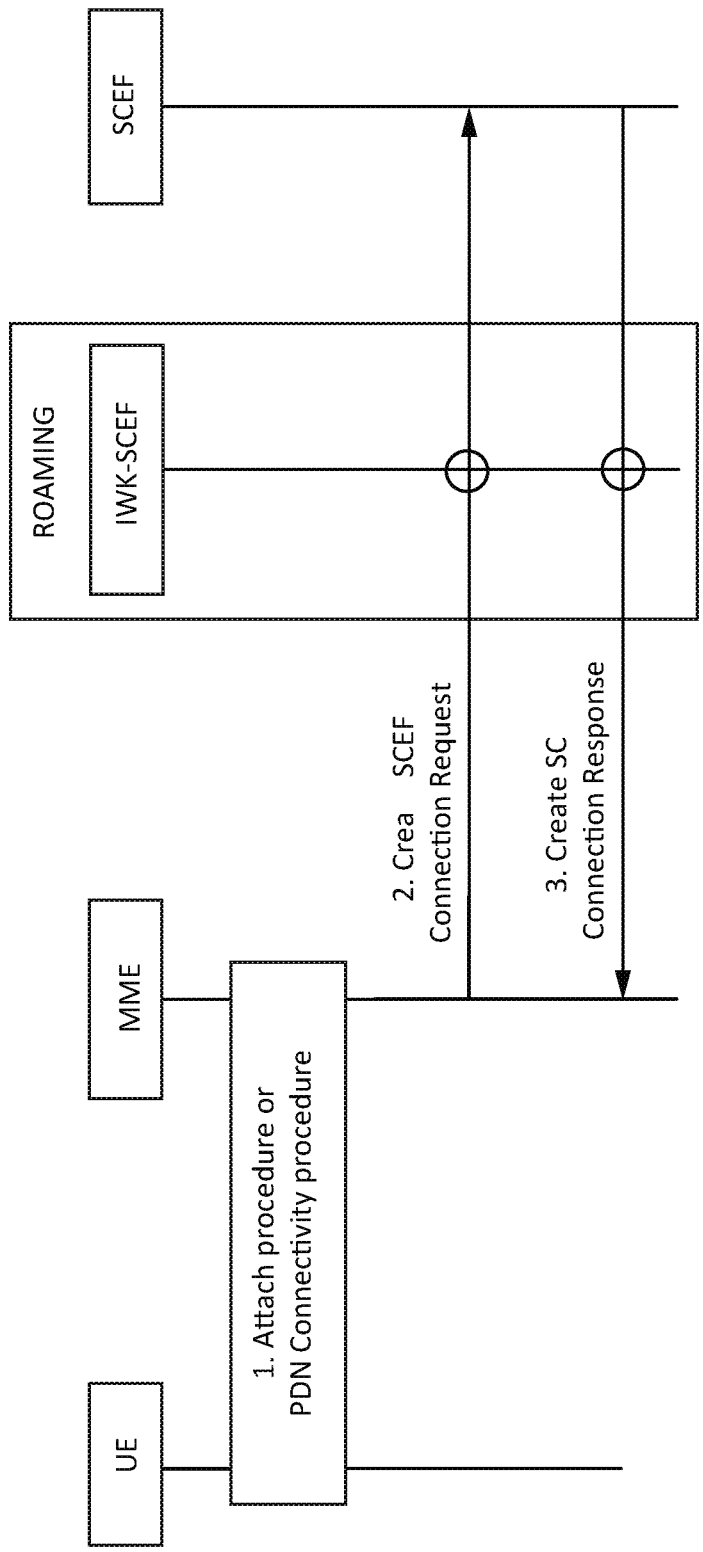
FIG. 2 is a call flow of an example method for configuration of non-IP data delivery (NIDD).

FIG. 2 illustrates the procedure of configuring necessary information at the SCEF, and HSS, and MME for transferring non-IP data. The procedure may also be used for replacing and deleting configuration information.

3GPP TS 23.401 describes the issue of "Support for session and service continuity and efficient user plane path." In order to address the specific needs of different applications and services, the next generation system architecture for mobile networks should support different levels of data session continuity based on the Mobility on demand concept of the Mobility framework or service continuity.

The next generation system may approach each session for a UE in a different way. For example, for each session, the system may: support session continuity; not support session continuity; or support service continuity when session continuity is not provided.

This issue affects selection of anchor point to achieve efficient user plane path, as well as enablement of reselection of anchor point to achieve efficient user plane path with minimum service interruption. A possible cause for user-plane path reselection may be UE mobility causing the current user plane path to become inefficient.

With support of mobile IP protocols, service continuity may be enabled. However, mobile IP protocol requires the end device user equipment (UE) to report its latest location to the home network, which may introduce too much overhead for some constrained IoT devices.

3GPP TS 23.401 proposes a framework to support three distinct session and service continuity modes (SSC) in the NextGen system. The solution assumes a PDU session to exist between a UE and a user-plane function (called terminating user-plane function (TUPF)). The TUPF terminates the 3GPP user plane and interfaces with the data network.

3GPP TS 23.401 describes a number of session and service continuity (SSC) modes. In SSC mode 1, the same TUPF is maintained regardless of the access technology (e.g., RATs and cells) a UE is using to access the network.

In SSC mode 2, the same TUPF is only maintained across a subset (e.g. one or more, but not all) of the access network attachment points (e.g. cells and RATs), referred to as the serving area of the TUPF. When the UE leaves the serving area of a TUPF, the UE will be served by a different TUPF suitable for the UE's new point of attachment to the network.

Figure 3:
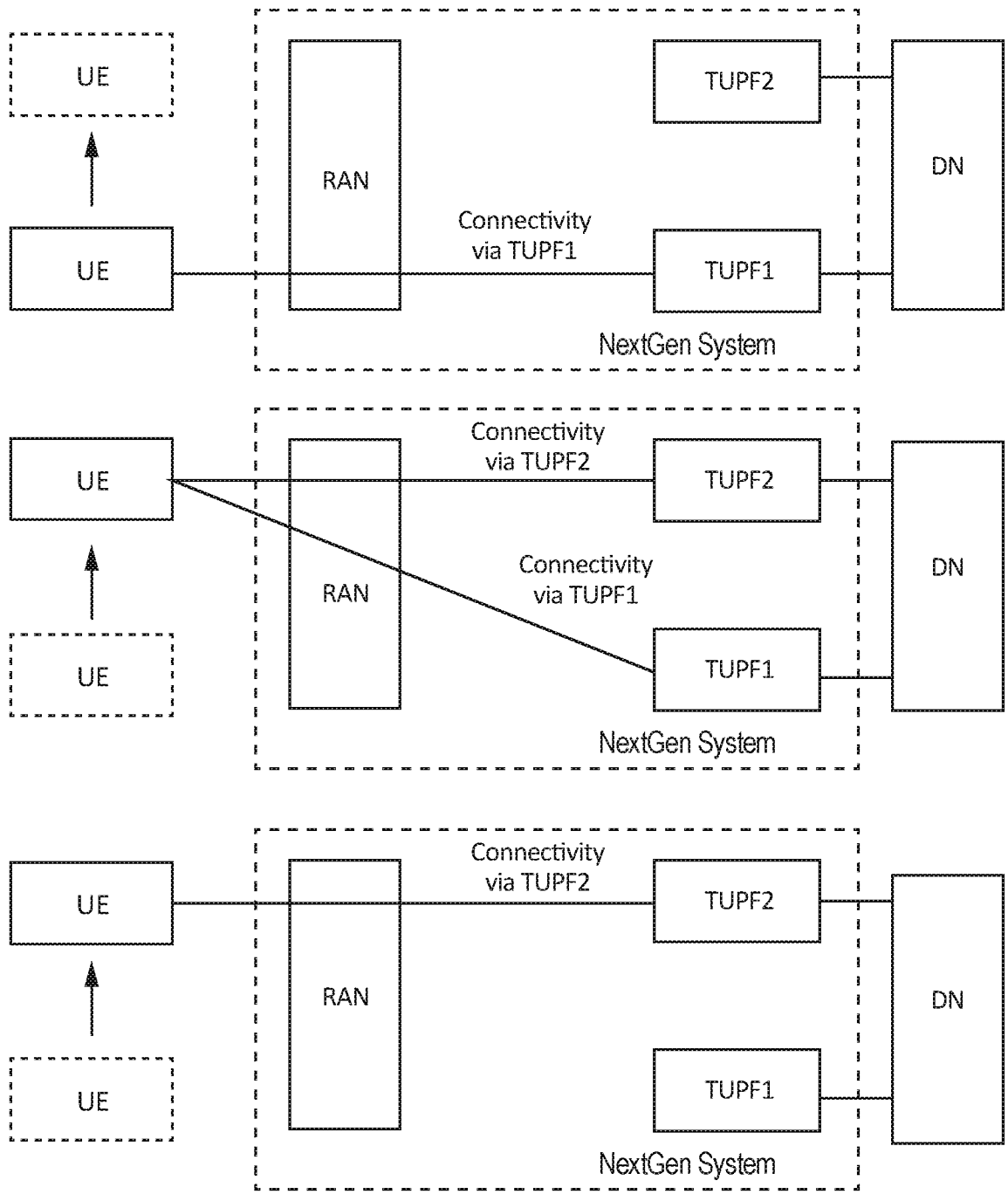
FIG. 3 illustrates an example of a Terminating User Plane Function (TUPF) relocation in Session and Service Continuity (SSC) mode 3.

In SSC mode 3, the network allows the establishment of UE connectivity via a new TUPF to the same data network (DN) before connectivity between the UE and the previous TUPF is terminated. FIG. 3 shows how to support the session continuity for SSC mode 3.

3GPP TR 23.799, Study on Architecture for Next Generation System describes a work task for service continuity when session continuity is not provided. The task includes identifying whether any relationship between NextGen system and upper-layer service continuity mechanisms is required, and to define such interaction if required.

The work task raises the question of how to provide service continuity when session continuity is not provided (e.g. when the user-plane anchor for a UE is relocated). This includes identifying whether upper-layer service continuity mechanisms are applied for a session and how to leverage or interact with such mechanisms.

Figure 4:
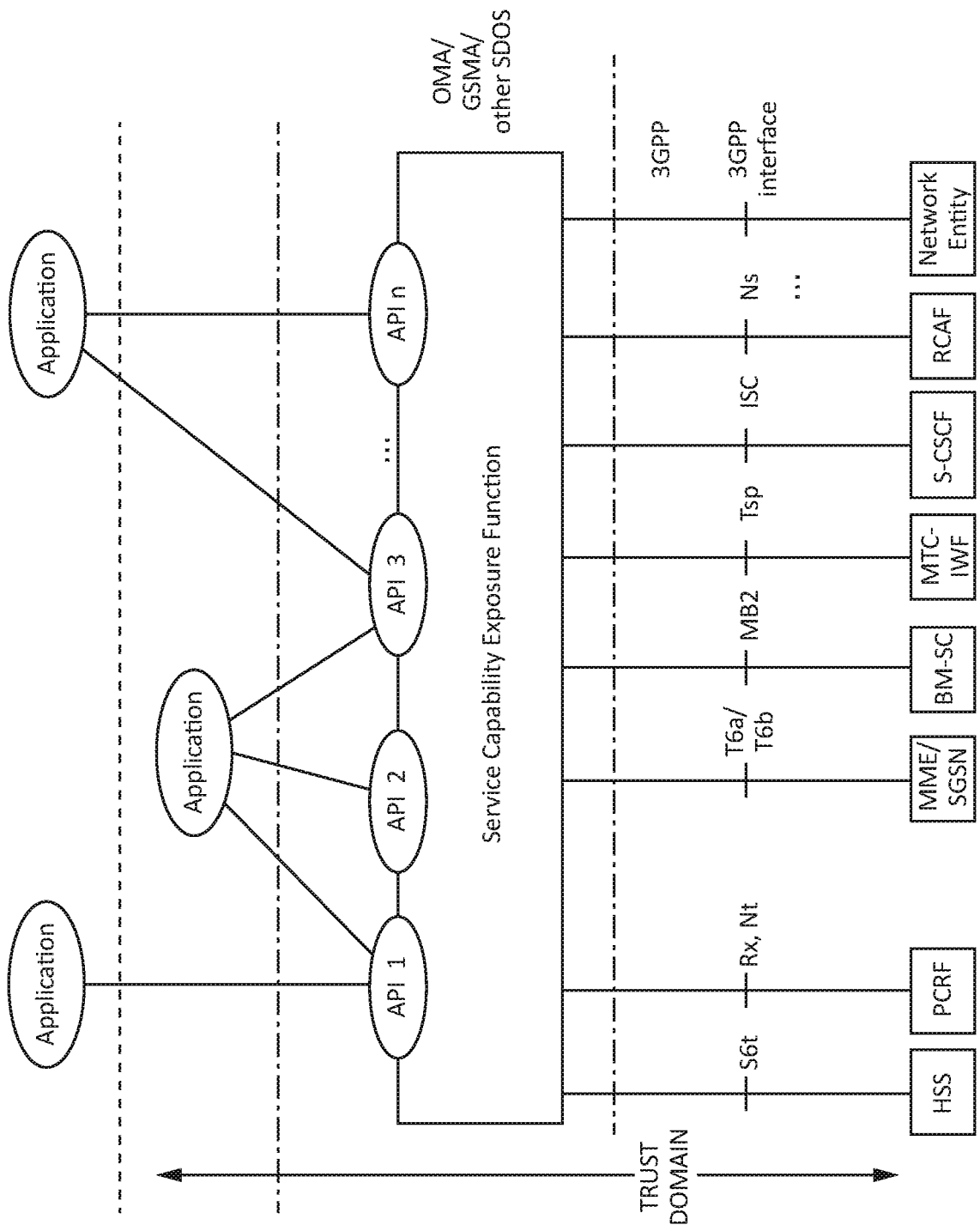
FIG. 4 illustrates an example of a Service Capability Exposure Function (SCEF) architecture.

A Service Capability Exposure Function (SCEF) is defined in 3GPP TS 23.682. FIG. 4 shows the architecture of the SCEF. The SCEF provides: a means to securely expose the services and capabilities provided by 3GPP network interfaces; a means for the discovery of the exposed service capabilities; and access to network capabilities through homogenous network application programming interfaces (e.g. Network API) defined by OMA, GSMA, and possibly other standard bodies. The SCEF abstracts the services from the underlying 3GPP network interfaces and protocols.

Individual instances of SCEF may vary depending on what service capabilities are exposed and what API features are supported.

The SCEF is always within the trust domain. An application may belong to the trust domain or may lie outside the trust domain.

Network Function Virtualization (NFV) aims to transform the way that network operators architect networks by evolving standard IT virtualization technology to consolidate many network equipment types onto industry standard high volume servers, switches and storage, which may be located in Data centers, Network Nodes and in the end user premises. It involves the implementation of network functions (e.g., mobility management, session management, QoS) in software that may run on a range of industry standard server hardware, and that may be moved to, or instantiated in, various locations in the network as required, without the need for installation of new equipment.

NFV is applicable to any data plane packet processing and control plane function in mobile and fixed networks. Potential examples may include: switching elements, such as BNG, CG-NAT, routers; mobile network nodes, such as HLR/HSS, MME, SGSN, GGSN/PDN-GW, RNC, and eNodeB; functions contained in home routers and set top boxes to create virtualized home environments; converged and network-wide functions, such as AAA servers, policy control, and charging platforms; application-level optimization, such as CDNs, cache servers, load balancers, application accelerators; and security functions, such as firewalls, virus scanners, intrusion detection systems, spam protection.

NFV is expected to bring many benefits to network operators, contributing to a dramatic change in the telecommunications industry landscape. NFV may bring the following benefits: reducing equipment costs and reduced power consumption through consolidating equipment and exploiting the economies of scale of the IT industry; increasing velocity of time to market by minimizing the typical network operator cycle of innovation; possibly of running production, test and reference facilities on the same infrastructure provides much more efficient test and integration, reducing development costs and time to market; targeted service introduction based on geography or customer sets is possible, e.g., where services may be rapidly scaled up/down as required; enabling a wide variety of eco-systems and encouraging openness.

NFV will further aid in: optimizing network configuration and/or topology in near real time based on the actual traffic/mobility patterns and service demand; supporting multi-tenancy thereby allowing network operators to provide tailored services and connectivity for multiple users, applications or internal systems or other network operators, all co-existing on the same hardware with appropriate secure separation of administrative domains; and reducing energy consumption by exploiting power management features in standard servers and storage, as well as workload consolidation and location optimization.

The European Telecommunications Standards Institute (ETSI) has formed a specification group "Network Functions Virtualization" to develop materials including standard terminology definitions and use cases for NFV that act as references for vendors and operators considering implementing NFV. See, e.g., ETSI GS NFV 002, Network Functions Virtualization (NFV); Architectural Framework, establishes an Architectural Framework for applying NFV concepts to the Mobile Core Network.

Figure 5:
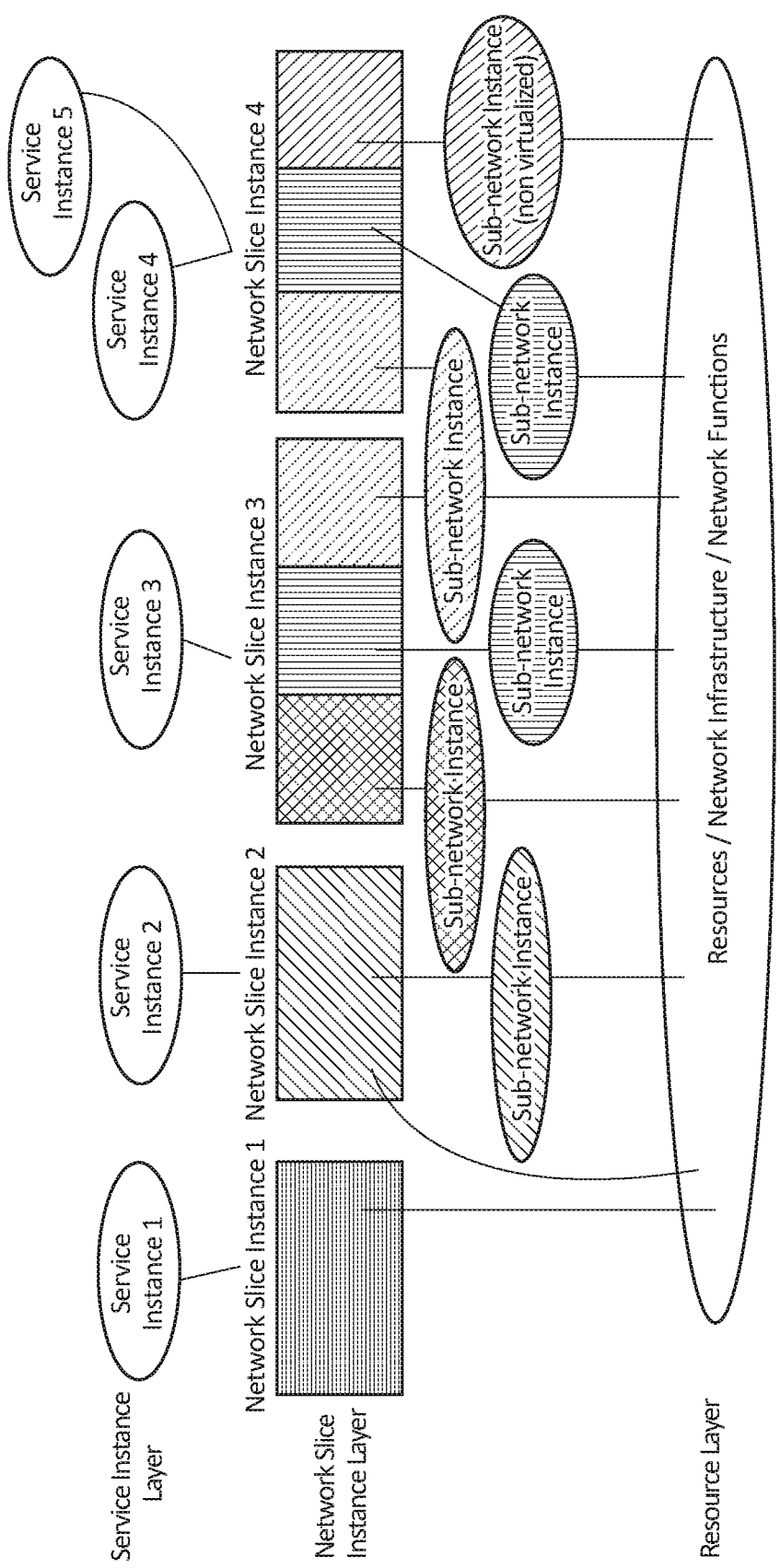
FIG. 5 is a conceptual outline illustrating the idea of network slicing.

FIG. 5 shows a conceptual architecture of network slicing. Network Slicing is a mechanism that may be used by mobile network operators to support multiple 'virtual' networks behind the air interface across the fixed part of the mobile operator's network, both backhaul and core network. See NGMN Alliance, "Description of Network Slicing Concept." This involves 'slicing' the network into multiple virtual networks to support different RANs or different service types running across a single RAN. Network slicing enables the operator to create networks customized to provide optimized solutions for different market scenarios which demands diverse requirements, e.g. in the areas of functionality, performance and isolation.

A network slice instance is made up of a set of network functions and the resources to run these network functions. In FIG. 5, different stipples are used to indicate the different network slice instances or sub-network slice instances. A sub-network slice instance comprises a set of network functions and resources to run those network functions, but is not in itself a complete logical network. A sub-network slice instance may be shared by multiple network slice instances 3GPP is designing a 5G network and is considering incorporating the network slicing technology. This technology is a good fit for the 5G network, because the 5G use cases (e.g., massive IoT, critical communications, and enhanced mobile broadband) demand very diverse and sometimes extreme requirements. The current pre-5G architecture utilizes a relatively monolithic network and transport framework to accommodate a variety of services such as mobile traffic from smart phones, OTT content, feature phones, data cards, and embedded M2M devices. It is anticipated that the current architecture is not flexible and scalable enough to efficiently support a wider range of business needs when each has its own specific set of performance, scalability and availability requirements. Furthermore, introduction of new network services should be made more efficient. Nevertheless, several use cases are anticipated to be active concurrently in the same operator network, thus requiring a high degree of flexibility and scalability of the 5G network.

Service continuity may be supported without session continuity in a 3GPP network in a number of ways. In general, the service continuity may be provisioned by the network operator as a value added service, for example, when a lightweight application protocol is used at the higher layer or the UE is a constrained device, so that some session management and service management procedures at higher layer are not repeated.

Service continuity may be supported by associating higher layer session and service information in the 3GPP network. Additionally, or alternatively, service continuity may be supported by resuming higher layer service when a new PDU session is created without transport layer session continuity, for instance.

Associating the higher layer end-to-end session with the PDU session in 3GPP network allows the 3GPP network to quickly resume the higher layer service when a new PDU session is established, even in the absence of the session continuity capability. The association may be performed as a pre-configuration step. When the IP anchor is relocated, the 3GPP network may help to restore the higher layer service relation (e.g., registration and subscription) based on the configuration, and the UE/AS may avoid repeating some of the higher layer processes. This is important for massive IoT applications since most IoT devices are constrained, and it is not efficient for them to repeat higher layer processes such as registration, subscription, etc.

Figure 6:
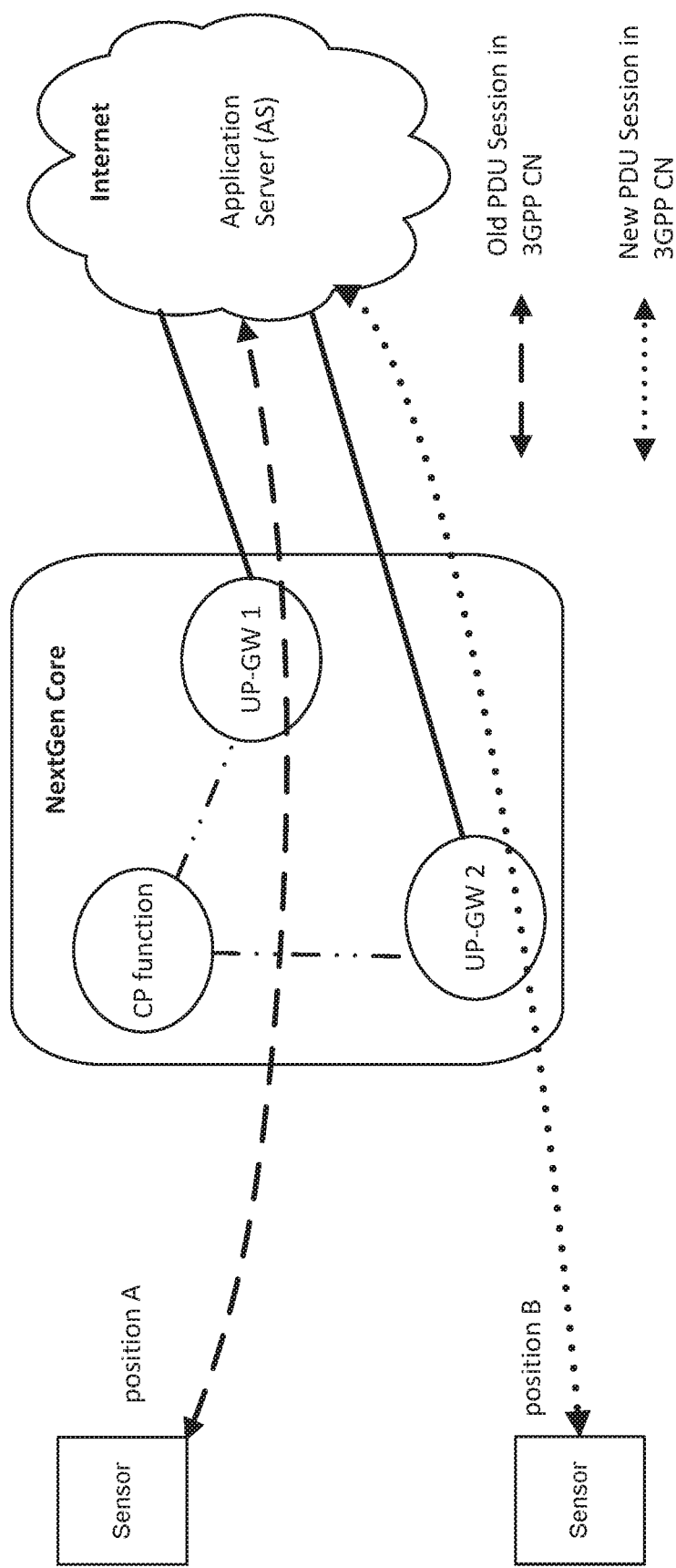
FIG. 6 illustrates an example use case of service continuity without session continuity.

FIG. 6 shows an example use case where supporting service continuity without session continuity would be beneficial. The example of FIG. 6 uses a 3GPP network. A mobile air quality sensor at position A registers with an application server (AS) to report the air quality readings. The sensor subscribes to some events such as software and firmware update at the AS. In other words, at the service layer (on top of transport network), the air quality sensor maintains an end-to-end session with the application server, e.g., a oneM2M service layer session. At the same time, a PDU session is established in the underlying 3GPP transport network, where a gateway UP-GW 1 serves as the IP anchor.

When the mobile sensor moves into a new service area at position B, which is geographically far away from gateway UP-GW 1, a new PDU session is established with a new IP anchor, gateway UP-GW 2, that is geographically closer to position B. The constrained sensor is in power saving mode when it is moving, and wakes up when it arrives at the new location.

In this example, without support for service continuity in 3GPP network, the core network may not be able to determine that there is an end-to-end session at a higher layer between a UE and the AS. Therefore, a UE, such as the mobile sensor, may need to re-register with AS over the new session in 3GPP network, and perform some procedures at higher layers for accessing the service, e.g., subscription/notification. The IP address used in the old PDU session is not preserved, and network cannot associate the new PDU session with the old PDU session, though they both are serving the same UE (e.g., the air quality sensor). It is not efficient to require the constrained devices to re-register with the server, and/or re-subscribe the same event at the AS every time when a new PDU session is created with a new IP anchor.

A network such as a 3GPP or other IoT network may be adapted to help to quickly resume the higher layer registration relationship and service between UEs and AS when these constrained devices wake up. Service continuity may be provided when session continuity is not supported, e.g., when the user-plane anchor of a UE needs to be relocated, via a variety of mechanisms. For IoT applications, if a light weight protocol is used at higher layer or the UE is a constrained device, it may not be possible to maintain those end-to-end session information at UE and at higher layer. The service continuity may be provided by the network operator as a value added service.

Network slicing enables the operator to create networks customized to provide optimized solutions for different market scenarios which demand diverse requirements, e.g. in the areas of functionality, performance and isolation.

Figure 7:
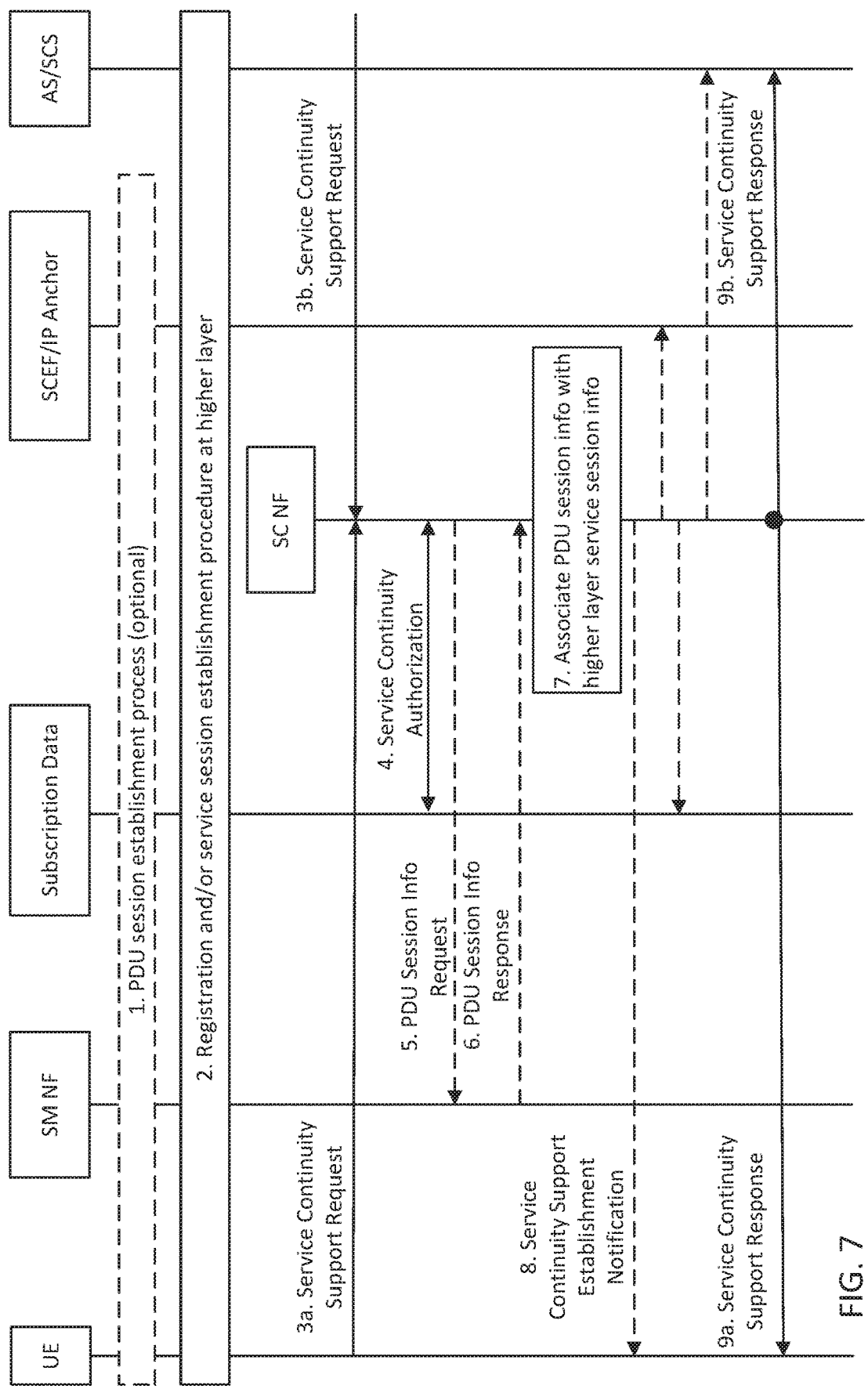
FIG. 7 is a call flow for an example method of initiating service continuity support in 3GPP network.

FIG. 7 shows the procedure of initiating the service continuity support at the 3GPP network assuming UE is already attached to the network but may not have a PDU session. A new logical entity called Service Continuity (SC) NF is proposed to provide the service continuity support in the 3GPP network. SC NF may co-locate with other network function (e.g., an SM NF) or network entity (e.g., an MME).

In step 1 of FIG. 7, a PDU session may be established for the UE. If a connection-less session is used, for example, Step 1 may be skipped.

In step 2, an application in the UE builds a higher layer session with the AS on top of the 3GPP transport network.

In step 3, once the higher layer session or service is setup, e.g., an application in the UE registers with the AS or subscribes a certain event at AS, the UE sends a 'Service Continuity Support Request' to the SC NF to configure its service continuity support in the 3GPP network. Alternatively, the AS may send such a message to the SC NF. A service continuity support request' may contain such message as: PDU session information such as session ID; IP address of the UE; IP address of the AS or APN/DNN; IP address or identity of the user plane anchor; SECF ID; session type (e.g., IPv4, IPv6, or non-IP); information of network slice serving the UE, such as network slice ID, network function instance ID; and higher layer session and service information, such as session ID of the higher layer session, application ID in the UE, external IDs of UE and AS, QoS requirements at the higher layer, subscription ID if application in UE subscribes certain events at AS at higher layer, protocol (HTTP, CoAP, oneM2M, etc.) on top of transport network. Alternative information may be used for other session formats, e.g., non-IP type sessions.

Either the UE or the AS may send the request message to initiate continuity support. In cases that the AS/SCS initiates the request, it may include a list of applications/services that is allowed to use service continuity capability, and the service provider may sponsor this usage. In other words, 3GPP network may not configure service continuity support between a UE and AS/SCS for the applications and services that are not in the list. Alternatively, this information may be pre-configured before PDU session is created.

The information conveyed in Step 3 enables the 3GPP network to quickly resume the higher layer service when a new PDU session is created without session continuity, since the application in the UE does not need to repeat the session establishment procedure with the AS at the higher layer.

In step 4, once the SC NF obtains the request, the SC NF contacts the subscription data base to check whether the UE is allowed to use the service continuity and to verify the PDU session information related to the UE, such as the ID of the SM NF serving the UE, the type of PDU session, or the address of IP anchor. Part of the session context information may also be stored in IP anchor, and the SM NF and SC NF may contact the IP anchor and/or the SM NF to get more session information if necessary.

In Steps 5 and 6, if the information mentioned in step 4 is stored in the SM NF, for example, the SM NF keeps the PDU session context, and the SC NF will contact the SM NF for this information in order to configure the service continuity support.

In step 7, the SC NF associates the higher layer session with the UE/AS pair. Specifically, the SC NF maintains a mapping between PDU session (e.g., as identified by UE, IP anchor and AS) and the higher layer session/service information. The IP anchor may be an SCEF or P-GW. In the meantime, the SC NF may assign a service continuity support ID, which may be used to refer to the mapping between the PDU session and the higher layer session.

In step 8, the SC NF optionally sends a notification to the SM NF, the subscription data base, the UE and/or the IP anchor to inform them that the service continuity is enabled for the UE/AS pair. The notification may contain the service continuity support ID along with the ID of the UE and the AS. Upon receiving the notification, the subscription data base may update the UE's subscription data. In addition, the UE or AS may store the higher layer session information binding with the 3GPP session, so that they may provide such information to the CN when needed.

In step 9, the SC NF sends a response to the UE and/or AS to indicate that service continuity is enabled for certain higher layer session and service. The response may include a reference number ID. The reference number ID may later be provided back to the network, by the UE or the AS when attempting to establish a new session for the Service.

The configuration of the service continuity support may also take place along with the procedure of establishing a PDU session if the higher layer session has been established before UE starts communicating with 3GPP network. Specifically, the UE/AS may indicate in the 'Create Session Request' message that the service continuity support is desired as an optional service provided by the 3GPP network for the higher layer session and service. However, the SC NF may still need to associate the higher layer session and service information with PDU session information when higher layer session is established, e.g., as described in relation to step 3 and step 9 of FIG. 7.

For the case that the higher layer session or service is updated, e.g., higher layer session has more QoS requirements or subscription is extended, while the PDU session in the 3GPP network remains the same, the SC NF may update the association based on the information provided by the UE or AS following steps 3 and 9 of FIG. 7. In the case that the PDU session is changed while higher layer session is not, 3GPP network will update the association information which binds the SL session with the updated PDU session. This operation is presented in the following section, which shows how service continuity is provisioned in 3GPP network.

Figure 8:
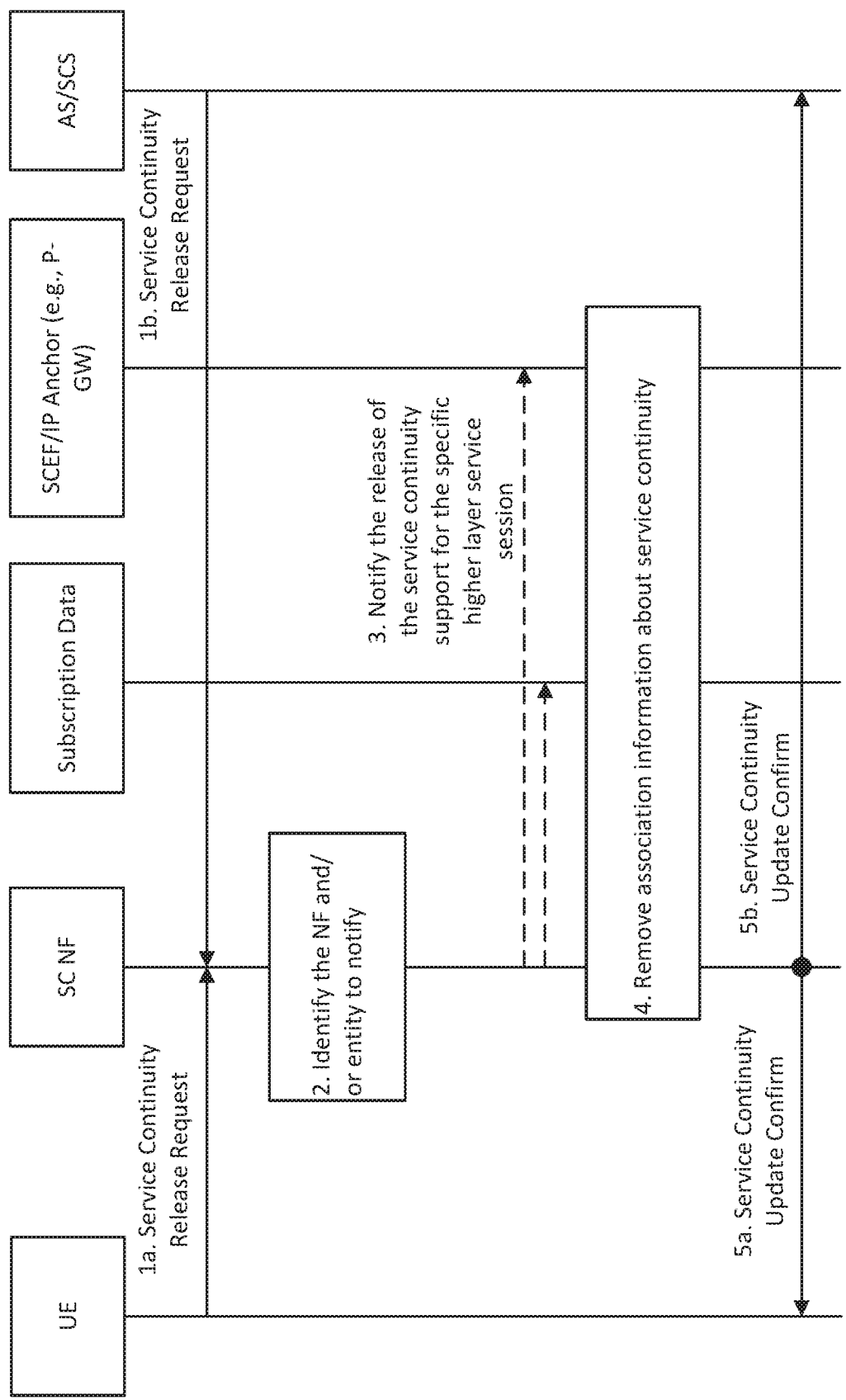
FIG. 8 is a call flow for an example method of releasing service continuity association with a Protocol Data Unit (PDU) session in a 3GPP network.

FIG. 8 is a call flow for an example method of releasing service continuity association with a Protocol Data Unit (PDU) session in a 3GPP network. If the higher layer session is released, the SC NF will dis-associate the higher layer session with the PDU session.

In step 1 of FIG. 8, once the associated higher layer session or service is released, e.g., higher layer session is terminated or subscription is cancelled, the UE or AS sends a message to the SC NF requesting release of the service continuity configuration. The message may contain information specific to the service continuity, such as: higher layer session and service information (such as the information described in relation to step 3 of FIG. 7); an identifier of UE and AS in 3GPP network; and a reference ID.

In step 2, based on the information from the UE and AS, the SC NF identifies the NF or network entities to contact to release the association for service continuity.

In step 3, the SC NF optionally notifies subscription data base, IP anchor of current PDU session, and/or SCEF. The IP anchor/SCEF may be a P-GW. If the service continuity association information is only maintained at SC NF, for example, then this step may be skipped.

In step 4, the NFs and network entities remove the service continuity information that is specific for the higher layer session or service between the UE and AS.

In step 5, the SC NF sends a response to the UE and/or AS to confirm that the requested action has been completed.

Higher layer service may be resumed when a new PDU session is created, even when there is no transport layer session continuity. A traditional PDU session in 3GPP network is connection oriented, meaning that the control signaling is exchanged for establishing a session, and data is transferred over the end-to-end session. The session information is maintained at the network entities over the UP path and outside of the 3GPP network until the session is released.

The constrained devices (e.g., UEs) may not be aware of the necessity of changing a data plane anchor (e.g., IP anchor) and PDU session (e.g., due to mobility) when they are in sleeping mode. When they wake up, they may send the TAU request to MM NF or data directly to the old IP anchor, which thus triggers the procedure of creating a new PDU session. Since traditionally the session continuity is not supported, the CN entity may retrieve the higher layer session information from certain CN entity, re-associate the higher layer session with the new PDU session, and notify both UE and AS about the new PDU session. Therefore, a UE is not required to repeat certain higher layer session procedures, such as re-registration and re-subscription, after the old PDU session is broken.

Figure 9:
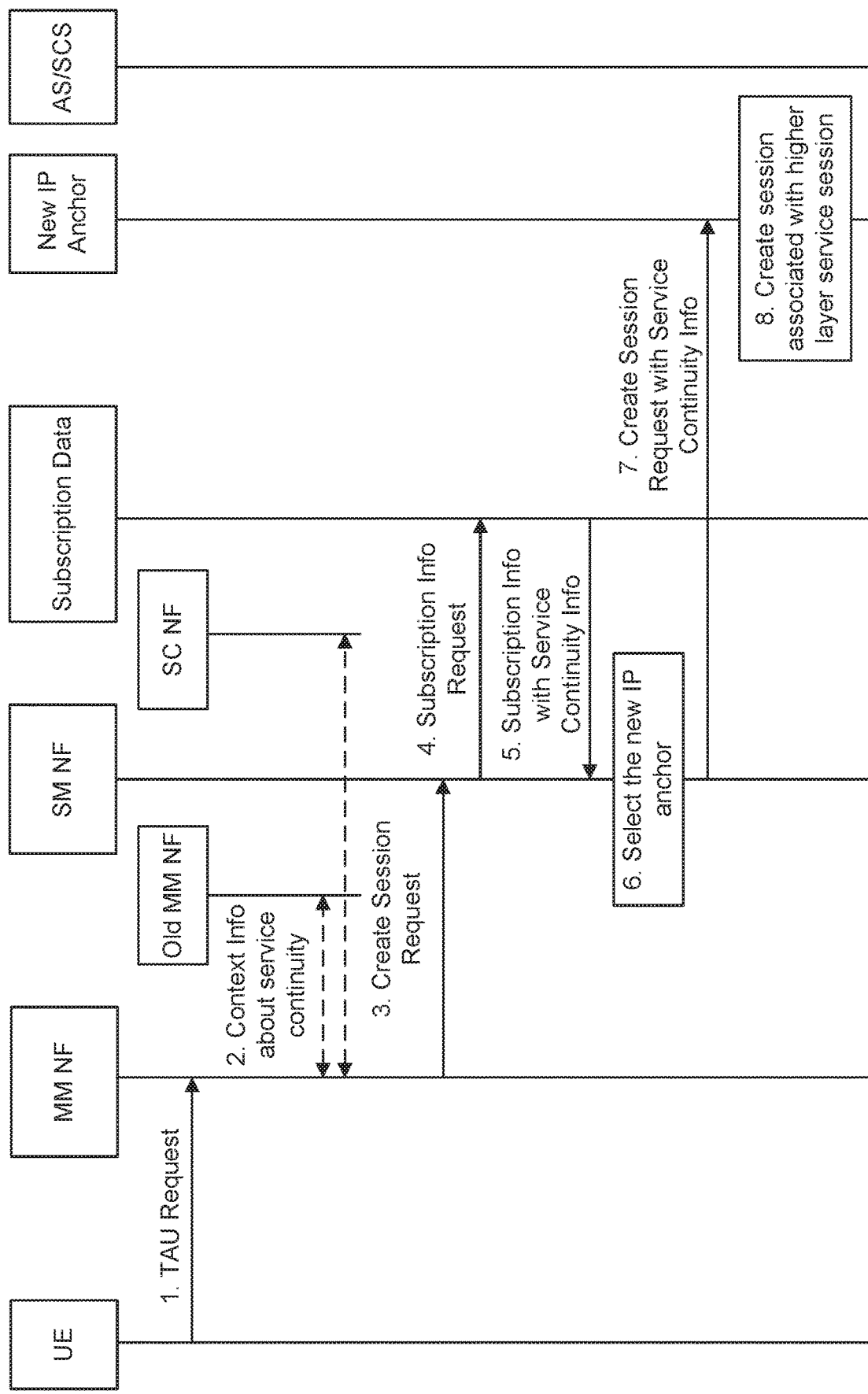
FIG. 9 is a call flow of a first part of an example method of providing service continuity triggered by a Tracking Area Update (TAU).
Figure 10:
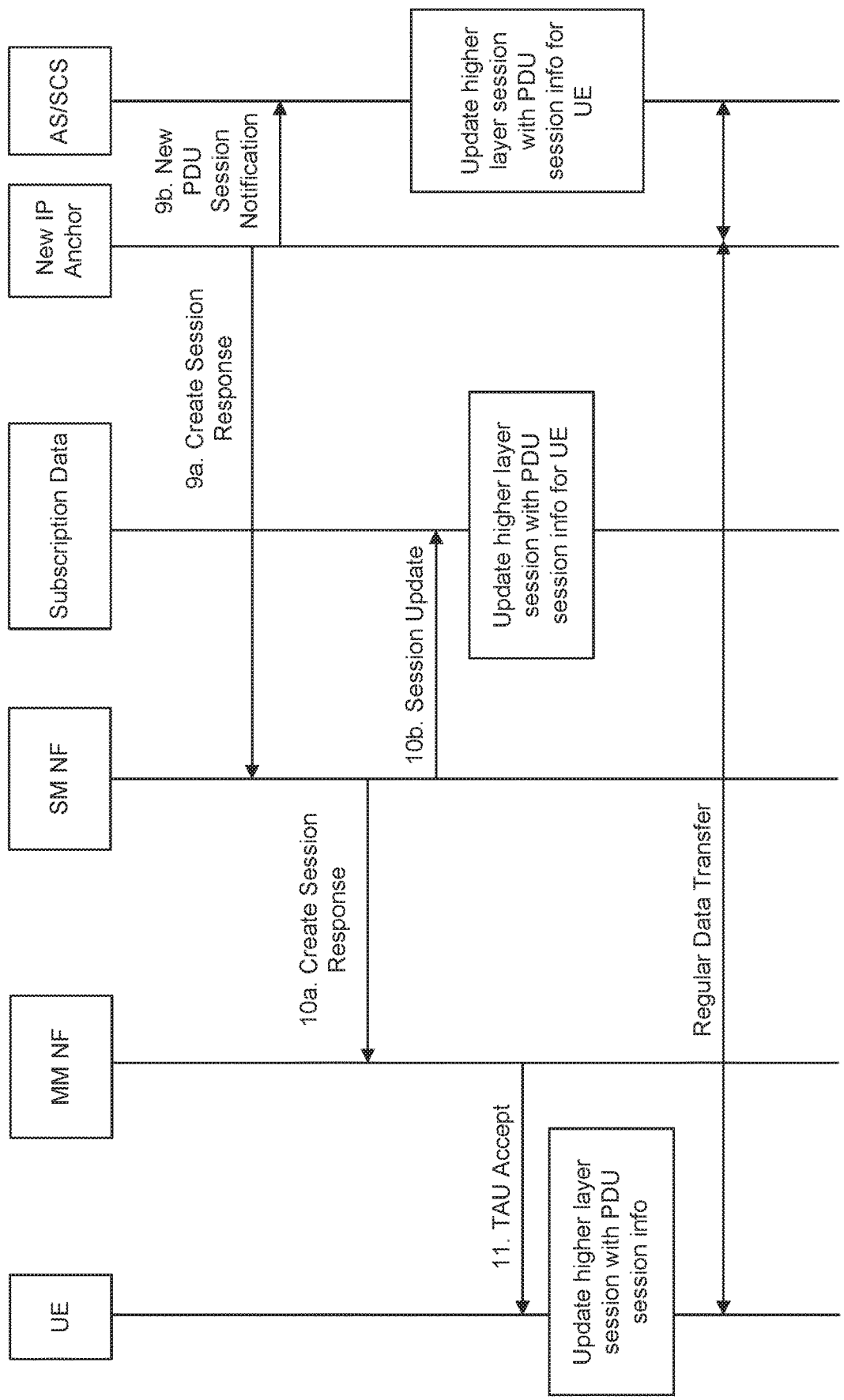
FIG. 10 is a call flow of the second part of an example method of providing service continuity triggered by a TAU.

FIGS. 9 and 10 illustrate methods for providing service continuity triggered by the TAU method when session continuity is not supported. Note that FIGS. 9 and 10 mainly focus on how to resume the higher layer service with service continuity support. For brevity, some messages and/or parameters specific to TAU procedure are not shown in FIGS. 9 and 10.

In step 1 of FIG. 9, a TAU request is sent from UE to MM NF. In addition to information in a conventional TAU request, here in FIG. 9 the TAU message may include information regarding the service continuity support. For example, the message may include an indicator that service continuity is enabled for the higher layer session or service between this UE and an AS and PDU session information, such as session ID, IP anchor address, reference number ID, and ID of SM NF instance. Since the UE may not be aware of its movement, or network function change, this PDU session information may already be obsolete. However, this information may help to obtain the information about service continuity. The message may further include Network slice ID with a list of NF instances included in the slice.

In step 2, if the TAU request message does not provide enough information, the MM NF may contact the old MM NF to get more information, such as ID of network slice serving the UE, ID of SM NF instance, ID of SC NF instance, address of IP anchor regardless of whether the PDU session is released or not. The MM NF may also contact SC NF to retrieve the higher layer session information, which will be passed to the SM NF and new IP anchor. It is possible that the subscription data base and/or SM NF maintains the higher layer session information, and the association information between higher layer session and PDU session, which implies that MM NF may contact subscription data base and/or SM NF to retrieve this information alternatively.

In step 3, the MM NF sends a 'Create Session Request' to the SM NF to create a new PDU session. This SM NF may be the SM NF managing the old PDU session or a new SM NF depending on whether the UE moved out of service area of the old SM NF. In the Create Session Request message, the service continuity indicator or reference number ID may be included, so that the SM NF will try to retrieve the service continuity information from another network entity when creating a new PDU session.

In Steps 4 and 5, the SM NF contacts the subscription data base to check the subscription data and security related information. In addition, the service continuity information that was configured along with the old PDU session will be sent to the SM NF. It is assumed that the subscription data base stores the service continuity information. Otherwise, the SC NF will be involved to get such information.

In step 6, based on information obtained from the above steps, the SM NF selects a new IP anchor to create a new PDU session by taking higher layer session information into account. Service continuity may be one of the factors that affects the selection of the new IP anchor by the SM NF. Different parameters may be considered, e.g., the latency and data rate requirements of higher layer session, the service type (e.g., subscription/notification, only uplink infrequent small data without reliability requirement), and the location of the AS, API provided by the AS.

In Steps 7 and 8, the SM NF asks the selected IP anchor to create a new PDU session providing the higher layer session and service information, so that the IP anchor knows the address of the AS and UE identification. In addition, the SM NF may notify the SC NF to update the association information as well.

The call flow of FIG. 9 is continued in FIG. 10. In step 9a of FIG. 10, the new IP anchor sends response to SM NF indicating PDU session is created.

At the same time, in step 9b the new IP anchor notifies AS that a new PDU session is created between the AS and UE, so that the original higher layer session and service may be resumed without repeating re-registration.

In step 10a, the SM NF sends response to the MM NF. The MMNF will later reply to the UE via a TAU accept message.

In step 10b, the SM NF also notifies the subscription data base about the new PDU session, which serves the original higher layer session and service.

In step 11, the MM NF sends a TAU accept message to UE, which includes the information of new PDU session, and an indication that higher layer session and service has been resumed on top of the new PDU session. The UE may now exchange data with the AS via the new IP anchor regularly.

Alternatively, service continuity may be triggered outside of any MM procedure, e.g., where it is initiated by the UE sending a request directly to the SM NF asking that a session be established in order to continue an old session.

Contrary to connection oriented communication, connection-less methods imply that data is transferred from source to destination without establishing an end-to-end connection. In 3GPP NextGen, connection-less methods may be efficient for the massive IoT applications, since the constrained IoT devices may send small infrequent data. A connection-oriented method may require too much control signaling compared to the amount of small bursty data transferred.

Different connection-less scenarios are possible. In a first example of a connection-less session, the session itself is connection-less, while the service or method of establishing the session is not connection-less. In other words, in this scenario control information is exchanged to establish a session in the 3GPP network, but the session information is not maintained by the network entity on the UP path, and the source sends out the data without checking status of the destination.

Alternatively, in a second example connection-less scenario, data may be sent without establishing a session. In other words, there is no PDU session required and the UP path is not established, instead the source may directly send data to the destination regardless of the status of CN and destination.

For the scenario that the data is transferred without a PDU session, service continuity support may be triggered when the UE or AS sends data to the network. The SC NF may help to retrieve the higher layer service session information, which may be used to determine the address of the service exposure NF to forward the data to the AS. The service exposure NF may, e.g., an SCEF.

Figure 11:
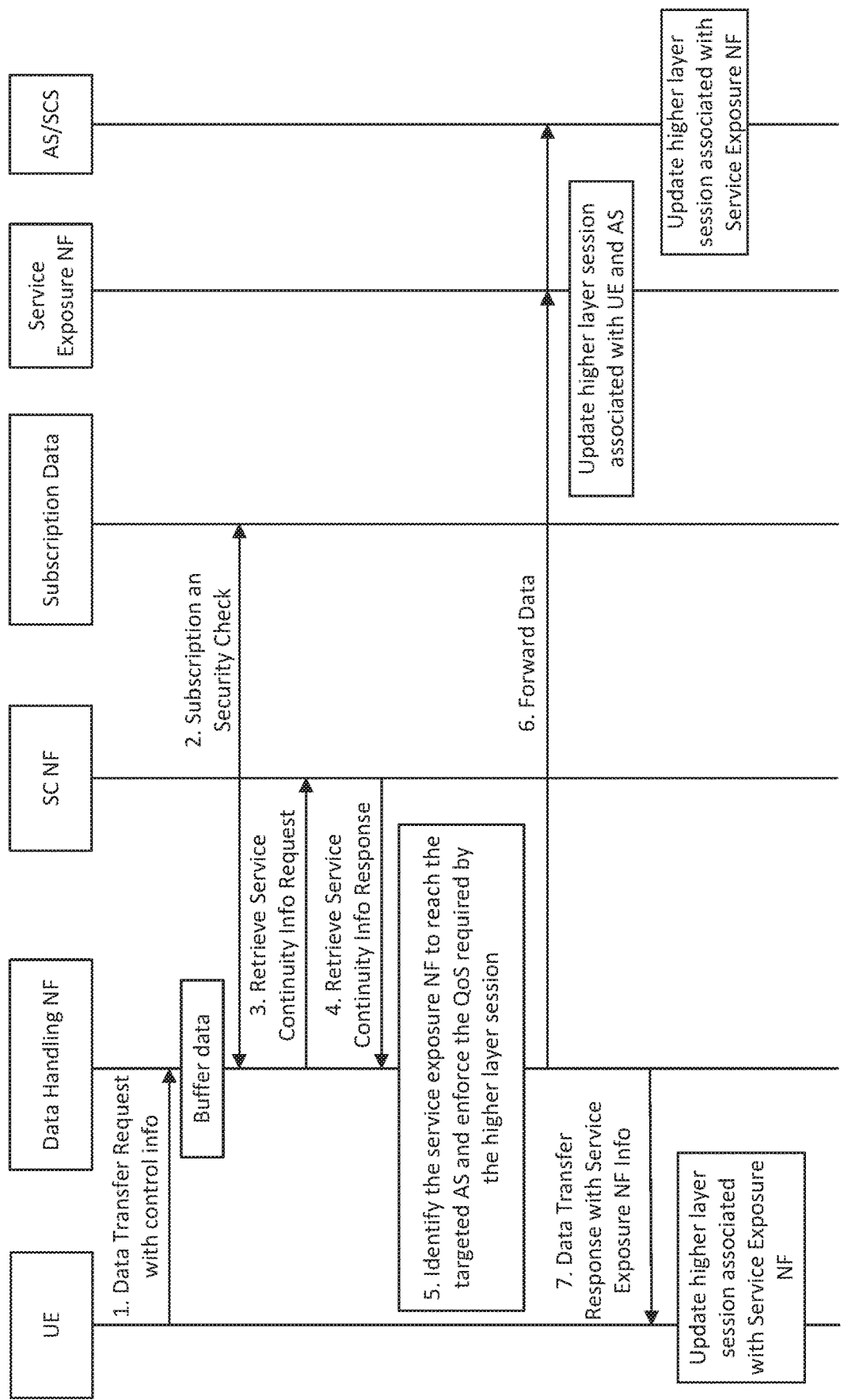
FIG. 11 is a call flow of an example method of providing service continuity without a PDU session established.

FIG. 11 shows the procedure of resuming the higher layer service session in 3GPP network for the connection-less PDU session. A data-handling NF is proposed to handle the data when the UE directly send the data to the network without establishing a PDU session.

In step 1, the UE sends data directly to the data-handling NF with some control information, since data transfer is connection-less. The control information may contain parameters specific to the service continuity support, such as a service continuity enablement indication, which tells the NF that the service continuity support is enabled for the higher layer session and service between the UE and a destination AS. The UE may not be aware that it should re-register or repeat some service subscription with AS at higher layer since the serving NFs or network entities changed. Therefore, this indicator may help the network to obtain the service continuity configuration as well as higher layer session/service information to resume the higher layer session and service.

The control information in step 1 may also include an external ID of UE and AS, higher layer session information and identifiers, and a higher layer subscriber ID.

In step 2, the data-handling NF buffers the data, and contacts the subscription data base to perform some regular security check. The service continuity information may include an ID of the SC NF instance that configures the service continuity support for higher layer session between the UE and AS. If not obtained in step 1, the higher layer session information, identifiers, and subscription information may be obtained from the subscriber data base in step 2.

In Steps 3 and 4, the data-handling NF then contacts the SC NF to retrieve the higher layer session and service information to resume the service. The session and service information may include, for example: an ID of the service exposure NF that may forward the data to the AS; and higher layer session ID and service information, such as external subscription ID defined at the higher layer.

In step 5, based on the information the data-handling NF has obtained, the data-handling NF may identify the service exposure NF to reach the destination AS. Since this is a connection-less data transfer, which is not reliable in the absence of a QoS requirement, the CN may use QoS requirements of the higher layer session for the data transfer. For example, the CN may provide reliability by requiring that the SCEF acknowledge the reception of uplink data.

In step 6, the data-handling NF forwards the buffered data to the AS through a service exposure NF.

In step 7, the data-handling NF replies the UE to confirm that data is delivered in a message that includes service exposure NF information.

FIG. 11 shows an example scenario in which data is transferred through the CP path, where service exposure NF (e.g., SCEF in LTE EPC) is involved. FIGS. 9 and 10 focus on a scenario in which data is transferred through a UP, where a PDU session is created and terminated at an IP anchor. Resuming higher layer service for other scenarios, e.g., connection-less data transfer over UP and connection oriented data transfer over CP, may be done in via methods similar to those described in reference to FIGS. 9, 10, and 11.

In order to use the service continuity capability provided by the underlying 3GPP transport network, a service layer (such as a oneM2M service layer, for example) needs to maintain information about the NW capabilities supported. The service layer also needs to maintain SL session information to be provided to the 3GPP transport network for service continuity purposes. A new resource may be used to expose this information in the oneM2M resource oriented architecture (ROA). Table 3 lists attributes of an example of such a resource, <UnderlyNwkCapability>.

TABLE 3

<UnderlyNwkCapability> Resource for Exposing Underlying Network Capability

| Attributes Name | Multiplicity | Description |
| --- | --- | --- |
| Creator | 0 . . . 1 | Indicates the entity which creates this resource |
| NetworkType | 0 . . . 1 | Indicates the type of underlying network, e.g., 3GPP transport network, or WiFi. |
| NetworkID | 0 . . . 1 | Indicates the ID of underlying network |
| NetworkOperatorID | 0 . . . 1 | Indicates the ID of underlying network operator |
| NetworkCapability | 1 | Indicates what capability is provided by the underlying network, e.g., service continuity capability without session continuity in 3GPP network |
| SupportedApplicationID | 0 . . . 1 (L) | Indicates a list of applications and/or services that are allowed to utilize the capability. The application may be hosted at UE, or as AE registered with CSE. This information is more likely provided by the service layer platform. |
| AddrOfContactPoint | 0 . . . 1 | Indicates the address of the contact point in the underlying network, e.g., SECF ID, or IP address of P-GW. |
| ConnectionType | 0 . . . 1 | Indicates if the connection supports IP, non-IP, or both |
| RequiredSLContinuityInfo | 0 . . . n (L) | Indicates a list of service layer information required by the underlying network for each service layer session configured to utilize the underlying network capability indicated by above attribute, e.g., service layer session ID, AE ID and CSE ID (e.g., AS), oneM2M subscription ID for service continuity capability. |

<UnderlyNwkCapability> may be managed following the standard procedures defined in oneM2M-TS-0001, oneM2M Functional Architecture—V2.10.1, e.g., create, retrieve, update and delete operation.

Figure 12:
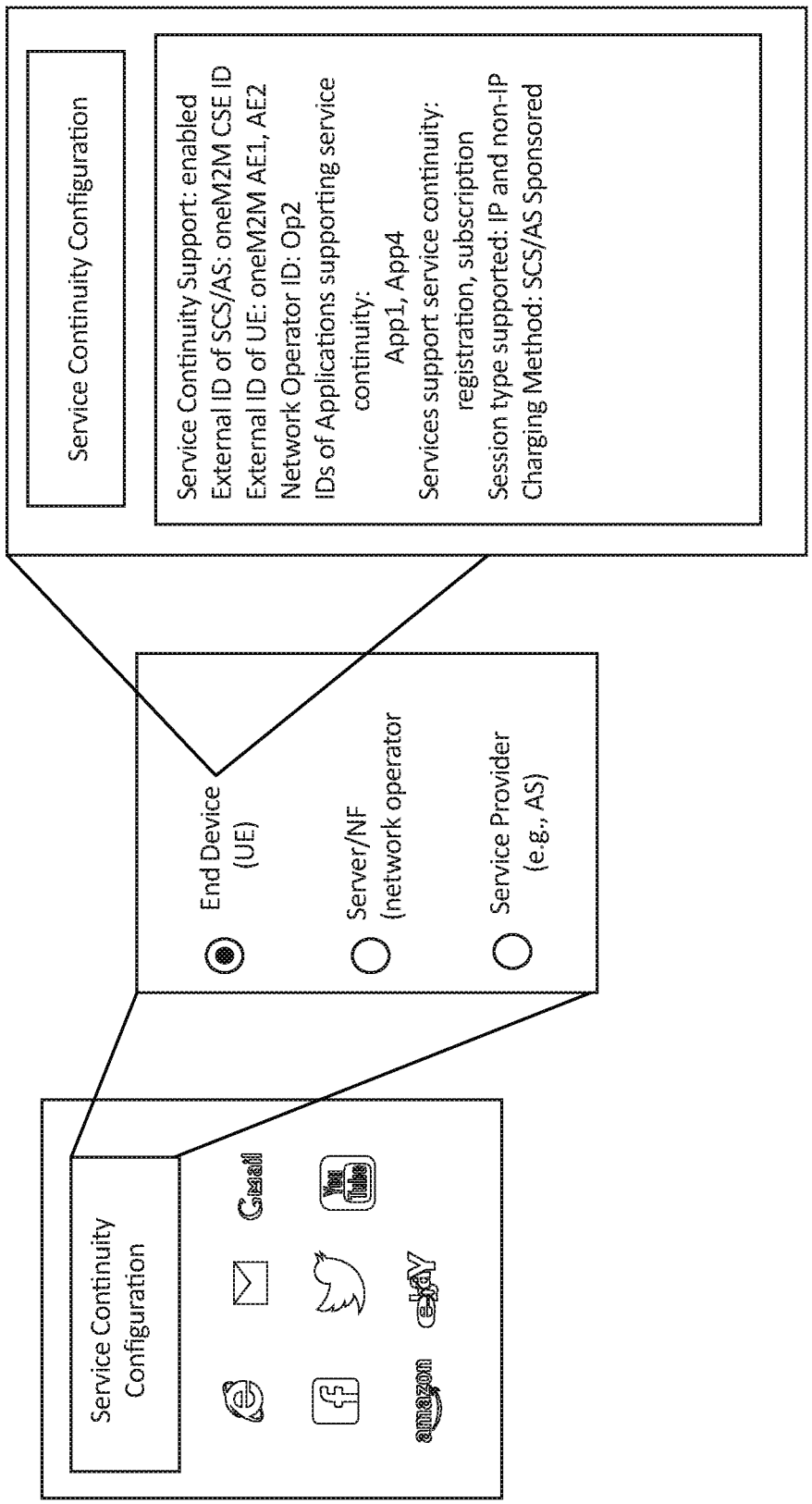
FIG. 12 illustrates an example user interface for configuring service continuity support.

FIG. 12 shows an example user interface for the management of service continuity. The service continuity support configuration parameters may be provisioned by the end user (e.g., UE), service provider (e.g., AS/SCS) or a network operator through a user interface, for example. In addition, the UE, AS, or network operator may retrieve and display the service continuity support configuration through the user interface. The user interface may be implemented for configuring or programming those parameters with default values, as well as enabling or disabling relay service.

The various techniques described herein may be implemented in connection with hardware, firmware, software or, where appropriate, combinations thereof. Such hardware, firmware, and software may reside in apparatuses located at various nodes of a communication network. The apparatuses may operate singly or in combination with each other to effect the methods described herein. As used herein, the terms "apparatus," "network apparatus," "node," "device," and "network node" may be used interchangeably.

Figure 13:
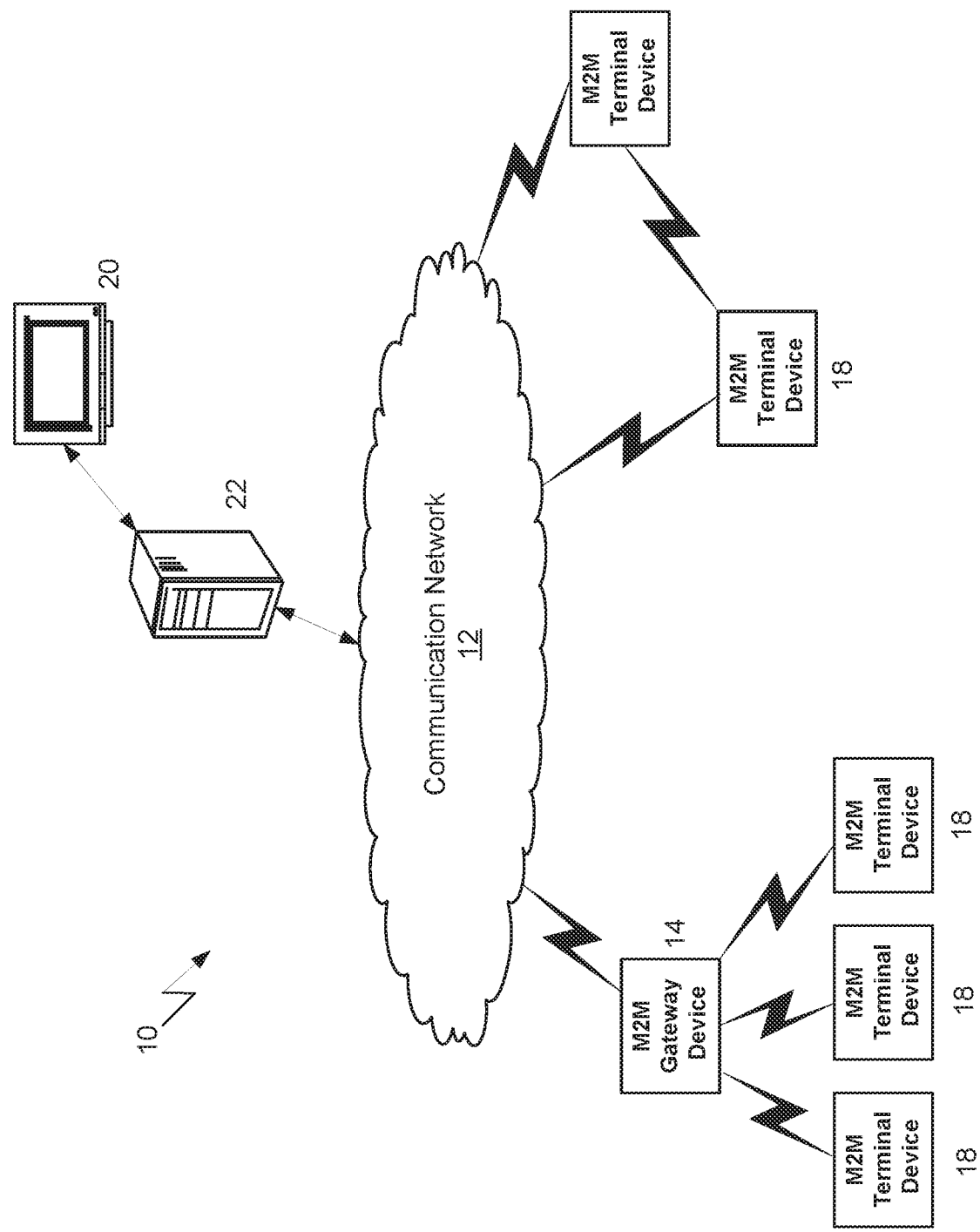
FIG. 13 is a system diagram of an example machine-to-machine (M2M), Internet of Things (IoT), or Web of Things (WoT) communication system in which one or more disclosed embodiments may be implemented.

FIG. 13 is a diagram of an example machine-to machine (M2M), Internet of Things (IoT), or Web of Things (WoT) communication system 10 in which one or more disclosed embodiments may be implemented. Generally, M2M technologies provide building blocks for the IoT/WoT, and any M2M device, M2M gateway, M2M server, or M2M service platform may be a component or node of the IoT/WoT as well as an IoT/WoT Service Layer, etc. Any of the client, proxy, or server devices illustrated in any of FIGS. 1-12 may comprise a node of a communication system, such as the ones illustrated in FIGS. 3-6.

The service layer may be a functional layer within a network service architecture. Service layers are typically situated above the application protocol layer such as HTTP, CoAP or MQTT and provide value added services to client applications. The service layer also provides an interface to core networks at a lower resource layer, such as for example, a control layer and transport/access layer. The service layer supports multiple categories of (service) capabilities or functionalities including a service definition, service runtime enablement, policy management, access control, and service clustering. Recently, several industry standards bodies, e.g., oneM2M, have been developing M2M service layers to address the challenges associated with the integration of M2M types of devices and applications into deployments such as the Internet/Web, cellular, enterprise, and home networks. A M2M service layer can provide applications and/or various devices with access to a collection of or a set of the above mentioned capabilities or functionalities, supported by the service layer, which can be referred to as a CSE or SCL. A few examples include but are not limited to security, charging, data management, device management, discovery, provisioning, and connectivity management which can be commonly used by various applications. These capabilities or functionalities are made available to such various applications via APIs which make use of message formats, resource structures and resource representations defined by the M2M service layer. The CSE or SCL is a functional entity that may be implemented by hardware and/or software and that provides (service) capabilities or functionalities exposed to various applications and/or devices (i.e., functional interfaces between such functional entities) in order for them to use such capabilities or functionalities.

As shown in FIG. 13, the M2M/IoT/WoT communication system 10 includes a communication network 12. The communication network 12 may be a fixed network (e.g., Ethernet, Fiber, ISDN, PLC, or the like) or a wireless network (e.g., WLAN, cellular, or the like) or a network of heterogeneous networks. For example, the communication network 12 may be comprised of multiple access networks that provide content such as voice, data, video, messaging, broadcast, or the like to multiple users. For example, the communication network 12 may employ one or more channel access methods, such as code division multiple access (CDMA), time division multiple access (TDMA), frequency division multiple access (FDMA), orthogonal FDMA (OFDMA), single-carrier FDMA (SC-FDMA), and the like. Further, the communication network 12 may comprise other networks such as a core network, the Internet, a sensor network, an industrial control network, a personal area network, a fused personal network, a satellite network, a home network, or an enterprise network for example.

As shown in FIG. 13, the M2M/IoT/WoT communication system 10 may include the Infrastructure Domain and the Field Domain. The Infrastructure Domain refers to the network side of the end-to-end M2M deployment, and the Field Domain refers to the area networks, usually behind an M2M gateway. The Field Domain and Infrastructure Domain may both comprise a variety of different nodes (e.g., servers, gateways, device, and the like) of the network. For example, the Field Domain may include M2M gateways 14 and devices 18. It will be appreciated that any number of M2M gateway devices 14 and M2M devices 18 may be included in the M2M/IoT/WoT communication system 10 as desired. Each of the M2M gateway devices 14 and M2M devices 18 are configured to transmit and receive signals, using communications circuitry, via the communication network 12 or direct radio link. A M2M gateway 14 allows wireless M2M devices (e.g., cellular and non-cellular) as well as fixed network M2M devices (e.g., PLC) to communicate either through operator networks, such as the communication network 12 or direct radio link. For example, the M2M devices 18 may collect data and send the data, via the communication network 12 or direct radio link, to an M2M application 20 or other M2M devices 18. The M2M devices 18 may also receive data from the M2M application 20 or an M2M device 18. Further, data and signals may be sent to and received from the M2M application 20 via an M2M Service Layer 22, as described below. M2M devices 18 and gateways 14 may communicate via various networks including, cellular, WLAN, WPAN (e.g., Zigbee, 6LoWPAN, Bluetooth), direct radio link, and wireline for example. Exemplary M2M devices include, but are not limited to, tablets, smart phones, medical devices, temperature and weather monitors, connected cars, smart meters, game consoles, personal digital assistants, health and fitness monitors, lights, thermostats, appliances, garage doors and other actuator-based devices, security devices, and smart outlets.

Figure 14:
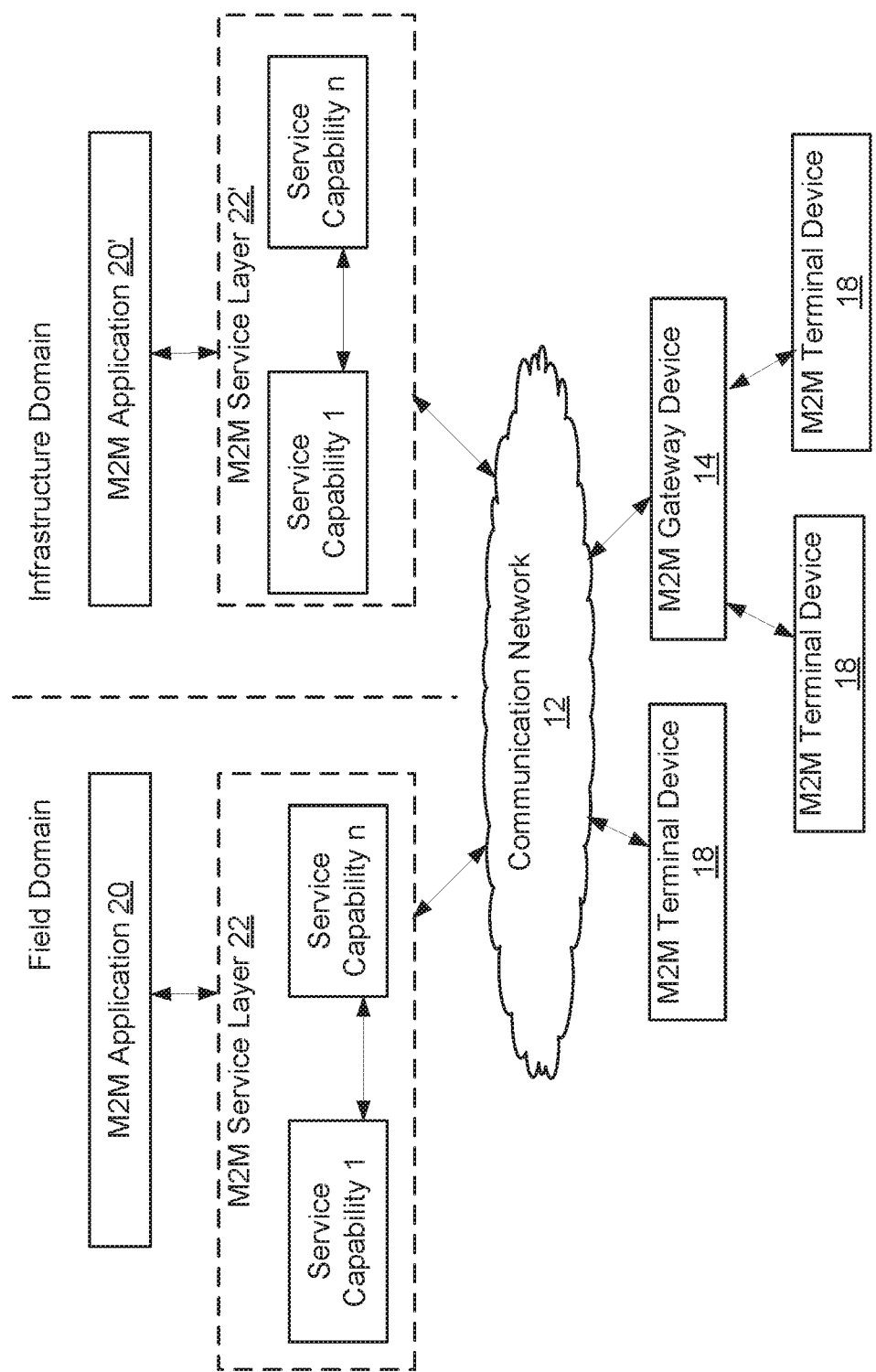
FIG. 14 is a system diagram of an example architecture that may be used within the M2M/IoT/WoT communications system illustrated in FIG. 13.

Referring to FIG. 14, the illustrated M2M Service Layer 22 in the field domain provides services for the M2M application 20, M2M gateways 14, and M2M devices 18 and the communication network 12. It will be understood that the M2M Service Layer 22 may communicate with any number of M2M applications, M2M gateways 14, M2M devices 18, and communication networks 12 as desired. The M2M Service Layer 22 may be implemented by one or more nodes of the network, which may comprise servers, computers, devices, or the like. The M2M Service Layer 22 provides service capabilities that apply to M2M devices 18, M2M gateways 14, and M2M applications 20. The functions of the M2M Service Layer 22 may be implemented in a variety of ways, for example as a web server, in the cellular core network, in the cloud, etc.

Similar to the illustrated M2M Service Layer 22, there is the M2M Service Layer 22' in the Infrastructure Domain. M2M Service Layer 22' provides services for the M2M application 20' and the underlying communication network 12 in the infrastructure domain. M2M Service Layer 22' also provides services for the M2M gateways 14 and M2M devices 18 in the field domain. It will be understood that the M2M Service Layer 22' may communicate with any number of M2M applications, M2M gateways and M2M devices. The M2M Service Layer 22' may interact with a Service Layer by a different service provider. The M2M Service Layer 22' may be implemented by one or more nodes of the network, which may comprise servers, computers, devices, virtual machines (e.g., cloud computing/storage farms, etc.) or the like.

Referring also to FIG. 14, the M2M Service Layers 22 and 22' provide a core set of service delivery capabilities that diverse applications and verticals may leverage. These service capabilities enable M2M applications 20 and 20' to interact with devices and perform functions such as data collection, data analysis, device management, security, billing, service/device discovery, etc. Essentially, these service capabilities free the applications of the burden of implementing these functionalities, thus simplifying application development and reducing cost and time to market. The Service Layers 22 and 22' also enable M2M applications 20 and 20' to communicate through various networks such as network 12 in connection with the services that the Service Layers 22 and 22' provide.

The M2M applications 20 and 20' may include applications in various industries such as, without limitation, transportation, health and wellness, connected home, energy management, asset tracking, and security and surveillance. As mentioned above, the M2M Service Layer, running across the devices, gateways, servers and other nodes of the system, supports functions such as, for example, data collection, device management, security, billing, location tracking/geofencing, device/service discovery, and legacy systems integration, and provides these functions as services to the M2M applications 20 and 20'.

Generally, a Service Layer, such as the Service Layers 22 and 22' illustrated in FIG. 14, defines a software middleware layer that supports value-added service capabilities through a set of Application Programming Interfaces (APIs) and underlying networking interfaces. Both the ETSI M2M and oneM2M architectures define a Service Layer. ETSI M2M's Service Layer is referred to as the Service Capability Layer (SCL). The SCL may be implemented in a variety of different nodes of the ETSI M2M architecture. For example, an instance of the Service Layer may be implemented within an M2M device (where it is referred to as a device SCL (DSCL)), a gateway (where it is referred to as a gateway SCL (GSCL)) and/or a network node (where it is referred to as a network SCL (NSCL)). The oneM2M Service Layer supports a set of Common Service Functions (CSFs) (i.e., service capabilities). An instantiation of a set of one or more particular types of CSFs is referred to as a Common Services Entity (CSE) which may be hosted on different types of network nodes (e.g., infrastructure node, middle node, application-specific node). The Third Generation Partnership Project (3GPP) has also defined an architecture for machine-type communications (MTC). In that architecture, the Service Layer, and the service capabilities it provides, are implemented as part of a Service Capability Server (SCS). Whether embodied in a DSCL, GSCL, or NSCL of the ETSI M2M architecture, in a Service Capability Server (SCS) of the 3GPP MTC architecture, in a CSF or CSE of the oneM2M architecture, or in some other node of a network, an instance of the Service Layer may be implemented as a logical entity (e.g., software, computer-executable instructions, and the like) executing either on one or more stand-alone nodes in the network, including servers, computers, and other computing devices or nodes, or as part of one or more existing nodes. As an example, an instance of a Service Layer or component thereof may be implemented in the form of software running on a network node (e.g., server, computer, gateway, device or the like) having the general architecture illustrated in FIG. 15 or FIG. 16 described below.

Further, the methods and functionalities described herein may be implemented as part of an M2M network that uses a Service Oriented Architecture (SOA) and/or a Resource-Oriented Architecture (ROA) to access services.

Figure 15:
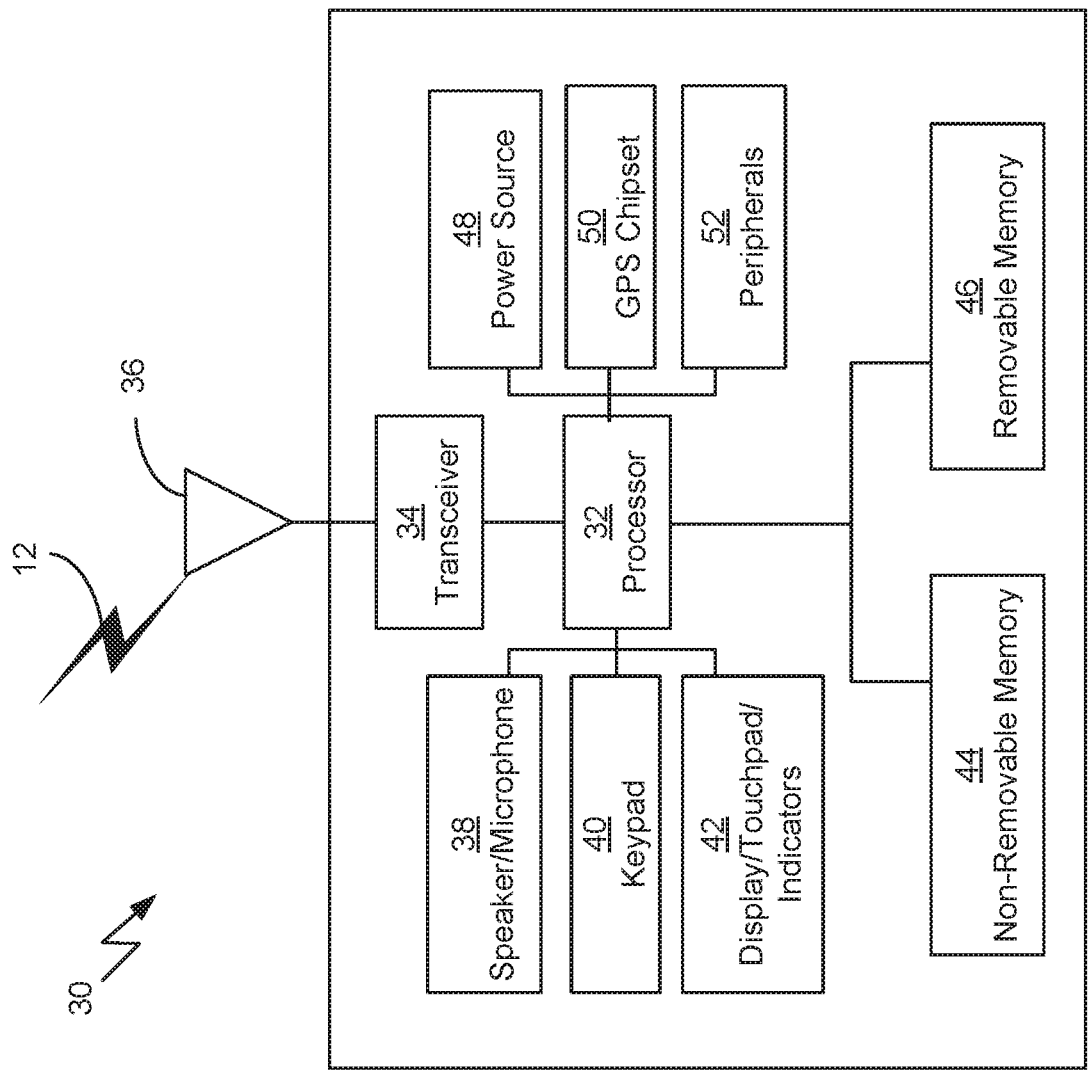
FIG. 15 is a system diagram of an example communication network node, such as an M2M/IoT/WoT device, gateway, or server that may be used within the communications system illustrated in FIGS. 13 and 14.

FIG. 15 is a block diagram of an example hardware/software architecture of a node of a network, such as one of the clients, servers, or proxies illustrated in FIG. 1, 2, or 5-9, which may operate as an M2M server, gateway, device, or other node in an M2M network such as that illustrated in FIGS. 1-12. As shown in FIG. 15, the node 30 may include a processor 32, non-removable memory 44, removable memory 46, a speaker/microphone 38, a keypad 40, a display, touchpad, and/or indicators 42, a power source 48, a global positioning system (GPS) chipset 50, and other peripherals 52. The node 30 may also include communication circuitry, such as a transceiver 34 and a transmit/receive element 36. It will be appreciated that the node 30 may include any sub-combination of the foregoing elements while remaining consistent with an embodiment. This node may be a node that implements service continuity support, e.g., in relation to the methods described in reference to FIGS. 1-3 and 7-12, Tables 3, or in a claim.

The processor 32 may be a general purpose processor, a special purpose processor, a conventional processor, a digital signal processor (DSP), a plurality of microprocessors, one or more microprocessors in association with a DSP core, a controller, a microcontroller, Application Specific Integrated Circuits (ASICs), Field Programmable Gate Array (FPGAs) circuits, any other type of integrated circuit (IC), a state machine, and the like. In general, the processor 32 may execute computer-executable instructions stored in the memory (e.g., memory 44 and/or memory 46) of the node in order to perform the various required functions of the node. For example, the processor 32 may perform signal coding, data processing, power control, input/output processing, and/or any other functionality that enables the node 30 to operate in a wireless or wired environment. The processor 32 may run application-layer programs (e.g., browsers) and/or radio access-layer (RAN) programs and/or other communications programs. The processor 32 may also perform security operations such as authentication, security key agreement, and/or cryptographic operations, such as at the access-layer and/or application layer for example.

As shown in FIG. 15, the processor 32 is coupled to its communication circuitry (e.g., transceiver 34 and transmit/receive element 36). The processor 32, through the execution of computer executable instructions, may control the communication circuitry in order to cause the node 30 to communicate with other nodes via the network to which it is connected. In particular, the processor 32 may control the communication circuitry in order to perform the service continuity support steps herein, e.g., in relation to FIGS. 1-3 and 7-12, Table3, or in a claim. While FIG. 15 depicts the processor 32 and the transceiver 34 as separate components, it will be appreciated that the processor 32 and the transceiver 34 may be integrated together in an electronic package or chip.

The transmit/receive element 36 may be configured to transmit signals to, or receive signals from, other nodes, including M2M servers, gateways, device, and the like. For example, in an embodiment, the transmit/receive element 36 may be an antenna configured to transmit and/or receive RF signals. The transmit/receive element 36 may support various networks and air interfaces, such as WLAN, WPAN, cellular, and the like. In an embodiment, the transmit/receive element 36 may be an emitter/detector configured to transmit and/or receive IR, UV, or visible light signals, for example. In yet another embodiment, the transmit/receive element 36 may be configured to transmit and receive both RF and light signals. It will be appreciated that the transmit/receive element 36 may be configured to transmit and/or receive any combination of wireless or wired signals.

In addition, although the transmit/receive element 36 is depicted in FIG. 15 as a single element, the node 30 may include any number of transmit/receive elements 36. More specifically, the node 30 may employ MIMO technology. Thus, in an embodiment, the node 30 may include two or more transmit/receive elements 36 (e.g., multiple antennas) for transmitting and receiving wireless signals.

The transceiver 34 may be configured to modulate the signals that are to be transmitted by the transmit/receive element 36 and to demodulate the signals that are received by the transmit/receive element 36. As noted above, the node 30 may have multi-mode capabilities. Thus, the transceiver 34 may include multiple transceivers for enabling the node 30 to communicate via multiple RATs, such as UTRA and IEEE 802.11, for example.

The processor 32 may access information from, and store data in, any type of suitable memory, such as the non-removable memory 44 and/or the removable memory 46. For example, the processor 32 may store session context in its memory, as described above. The non-removable memory 44 may include random-access memory (RAM), read-only memory (ROM), a hard disk, or any other type of memory storage device. The removable memory 46 may include a subscriber identity module (SIM) card, a memory stick, a secure digital (SD) memory card, and the like. In other embodiments, the processor 32 may access information from, and store data in, memory that is not physically located on the node 30, such as on a server or a home computer. The processor 32 may be configured to control lighting patterns, images, or colors on the display or indicators 42 to reflect the status of an M2M Service Layer session migration or sharing or to obtain input from a user or display information to a user about the node's session migration or sharing capabilities or settings. In another example, the display may show information with regard to a session state.

The processor 32 may receive power from the power source 48, and may be configured to distribute and/or control the power to the other components in the node 30. The power source 48 may be any suitable device for powering the node 30. For example, the power source 48 may include one or more dry cell batteries (e.g., nickel-cadmium (NiCd), nickel-zinc (NiZn), nickel metal hydride (NiMH), lithium-ion (Li-ion), etc.), solar cells, fuel cells, and the like.

The processor 32 may also be coupled to the GPS chipset 50, which is configured to provide location information (e.g., longitude and latitude) regarding the current location of the node 30. It will be appreciated that the node 30 may acquire location information by way of any suitable location-determination method while remaining consistent with an embodiment.

The processor 32 may further be coupled to other peripherals 52, which may include one or more software and/or hardware modules that provide additional features, functionality and/or wired or wireless connectivity. For example, the peripherals 52 may include various sensors such as an accelerometer, biometrics (e.g., finger print) sensors, an e-compass, a satellite transceiver, a sensor, a digital camera (for photographs or video), a universal serial bus (USB) port or other interconnect interfaces, a vibration device, a television transceiver, a hands free headset, a Bluetooth® module, a frequency modulated (FM) radio unit, a digital music player, a media player, a video game player module, an Internet browser, and the like.

The node 30 may be embodied in other apparatuses or devices, such as a sensor, consumer electronics, a wearable device such as a smart watch or smart clothing, a medical or eHealth device, a robot, industrial equipment, a drone, a vehicle such as a car, truck, train, or airplane. The node 30 may connect to other components, modules, or systems of such apparatuses or devices via one or more interconnect interfaces, such as an interconnect interface that may comprise one of the peripherals 52.

Figure 16:
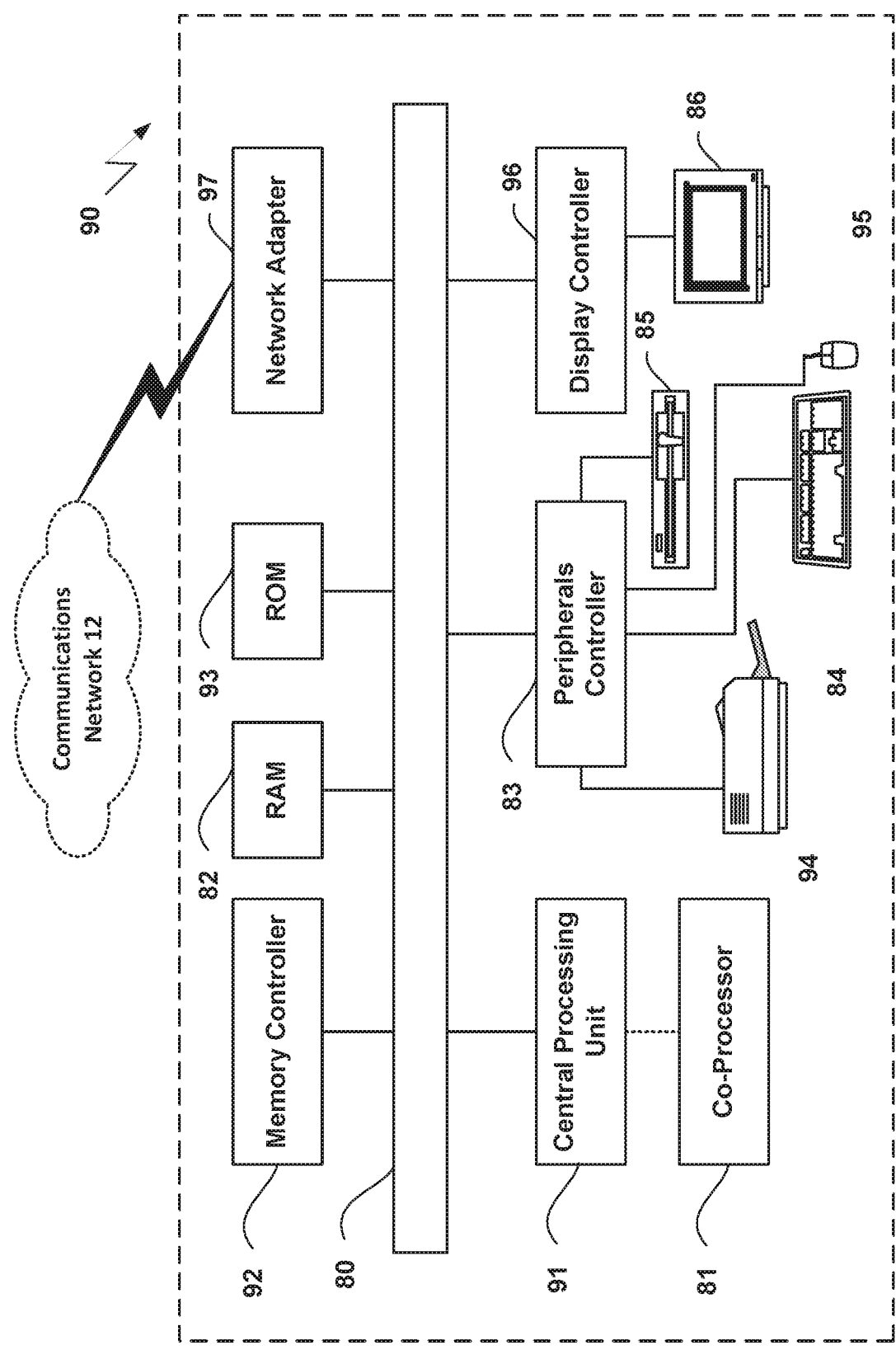
FIG. 16 is a block diagram of an example computing system in which a node of the communication system of FIGS. 13 and 14 may be embodied.

FIG. 16 is a block diagram of an exemplary computing system 90 which may also be used to implement one or more nodes of a network, such as the clients, servers, or proxies illustrated in FIGS. 1-12, which may operate as an M2M server, gateway, device, or other node in an M2M network such as that illustrated in FIGS. 3-6. Computing system 90 may comprise a computer or server and may be controlled primarily by computer readable instructions, which may be in the form of software, wherever, or by whatever means such software is stored or accessed. Such computer readable instructions may be executed within a processor, such as central processing unit (CPU) 91, to cause computing system 90 to do work. In many known workstations, servers, and personal computers, central processing unit 91 is implemented by a single-chip CPU called a microprocessor. In other machines, the central processing unit 91 may comprise multiple processors. Coprocessor 81 is an optional processor, distinct from main CPU 91, that performs additional functions or assists CPU 91. CPU 91 and/or coprocessor 81 may receive, generate, and process data related to the disclosed systems and methods for E2E M2M Service Layer sessions, such as receiving session credentials or authenticating based on session credentials.

In operation, CPU 91 fetches, decodes, and executes instructions, and transfers information to and from other resources via the computer's main data-transfer path, system bus 80. Such a system bus connects the components in computing system 90 and defines the medium for data exchange. System bus 80 typically includes data lines for sending data, address lines for sending addresses, and control lines for sending interrupts and for operating the system bus. An example of such a system bus 80 is the PCI (Peripheral Component Interconnect) bus.

Memories coupled to system bus 80 include random access memory (RAM) 82 and read only memory (ROM) 93. Such memories include circuitry that allows information to be stored and retrieved. ROMs 93 generally contain stored data that cannot easily be modified. Data stored in RAM 82 may be read or changed by CPU 91 or other hardware devices. Access to RAM 82 and/or ROM 93 may be controlled by memory controller 92. Memory controller 92 may provide an address translation function that translates virtual addresses into physical addresses as instructions are executed. Memory controller 92 may also provide a memory protection function that isolates processes within the system and isolates system processes from user processes. Thus, a program running in a first mode may access only memory mapped by its own process virtual address space; it cannot access memory within another process's virtual address space unless memory sharing between the processes has been set up.

In addition, computing system 90 may contain peripherals controller 83 responsible for communicating instructions from CPU 91 to peripherals, such as printer 94, keyboard 84, mouse 95, and disk drive 85.

Display 86, which is controlled by display controller 96, is used to display visual output generated by computing system 90. Such visual output may include text, graphics, animated graphics, and video. Display 86 may be implemented with a CRT-based video display, an LCD-based flat-panel display, gas plasma-based flat-panel display, or a touch-panel. Display controller 96 includes electronic components required to generate a video signal that is sent to display 86.

Further, computing system 90 may contain communication circuitry, such as for example a network adaptor 97, that may be used to connect computing system 90 to an external communications network, such as network 12 of FIGS. 13-16, to enable the computing system 90 to communicate with other nodes of the network. The communication circuitry, alone or in combination with the CPU 91, may be used to perform the context service continuity support steps herein, e.g., in relation to FIGS. 1-3 and 7-12, and Table 3, or in a claim.

The invention claimed is:

1. A first apparatus comprising a processor, a memory, and communication circuitry, the first apparatus being connected to a communications network via its communication circuitry, the first apparatus further comprising computer-executable instructions stored in the memory of the first apparatus which, when executed byte processor of the first apparatus, cause the first apparatus to:
   receive a service continuity request comprising an identifier of a first Protocol Data Unit, PDU, session of a second apparatus and information associated with a higher layer service that uses the first PDU session, wherein the first PDU session is established between the second apparatus and a first Internet protocol, IP, anchor;
   associate the first PDU session of the second apparatus with the information associated with the higher layer service in accordance with the service continuity request; and
   receive from a third apparatus a request for higher layer session information associated with the identifier of the first PDU session;
   provide the higher layer session information to the third apparatus to establish a second PDU session on behalf of the second apparatus for the second apparatus to resume the higher level service, the second PDU session being established between the second apparatus and a second IP anchor; and
   associate, in response to a notification from a Session Management Network Function, SM NF, the higher level service with the second PDU session.

2. The first apparatus of claim 1, wherein the instructions further cause the first apparatus to:
   send a subscription query to a subscription entity, the subscription query pertaining to propriety of the continuity request;
   receive a subscription response from the subscription entity; and
   determine, based on the subscription response, whether to associate the first PDU session of the second apparatus with the information associated with the higher layer service in accordance with the subscription response.

3. The first apparatus of claim 1, wherein the instructions further cause the first apparatus to:
   receive a PDU session release request, the PDU session release request comprising an identifier of the first session of the second apparatus and the higher layer service; and remove the association of the second apparatus with the higher layer service in accordance with the release request.

4. The apparatus of claim 1, wherein the service continuity request is sent in a tracking area update.

5. The apparatus of claim 1, wherein the service continuity request is sent in an attach request.

6. The apparatus of claim 1, wherein the service continuity request is sent in a reattach request.

7. A method performed by a first apparatus in a network, the method comprising:
receiving a service continuity request, the service continuity request comprising an identifier of a first session of a second apparatus and an identifier of a higher layer service, the first session being a Protocol Data Unit, PDU, session established between the second apparatus and a first Internet Protocol, IP anchor;
associating the first session of the second apparatus with the higher layer service in accordance with the service continuity request;
receiving from a third apparatus a request for higher layer session information associated with the identifier of the first PDU session;
providing the higher layer session information to the third apparatus to establish a second session on behalf of the second apparatus for the second apparatus to resume the higher level service, the second session being a PDU session established between the second apparatus and a second, IP anchor;
associating, in response to a notification from a Session Management Network Function, SM NF, the higher level service with the second session.

8. The method of claim 7, further comprising:
sending a subscription query to a subscription entity, the subscription query pertaining to propriety of the service continuity request;
receiving a subscription response from the subscription entity; and
determining, based on the subscription response, whether to associate the first session of the second apparatus with the higher layer service in accordance.

9. The method of claim 7, further comprising:
receiving a release request, the release request comprising an identifier of the first session of the second apparatus and the identifier of a higher layer service; and
removing the association of the second apparatus with the higher layer service in accordance with the release request.

* * * * *